US012617308B2

(12) United States Patent
Ehara et al.

(10) Patent No.: US 12,617,308 B2
(45) Date of Patent: May 5, 2026

(54) POWER SUPPLY SYSTEM, SERVER, AND POWER ADJUSTMENT METHOD

(71) Applicant: TOYOTA JIDOSHA KABUSHIKI KAISHA, Toyota (JP)

(72) Inventors: Masato Ehara, Gotemba (JP); Daiki Yokoyama, Gotemba (JP); Yuki Takahashi, Susono (JP); Tomoya Takahashi, Ebina (JP); Tomoyuki Kubota, Susono (JP); Sachio Toyora, Gotemba (JP); Keisuke Fukuoka, Fujieda (JP); Zidan Xu, Yokohama (JP); Wenfeng Liang, Yokohama (JP); Hiroki Murata, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 862 days.

(21) Appl. No.: 18/049,752

(22) Filed: Oct. 26, 2022

(65) Prior Publication Data

US 2023/0226939 A1     Jul. 20, 2023

(30) Foreign Application Priority Data

Jan. 17, 2022     (JP) ................................ 2022-004972

(51) Int. Cl.
| | |
|---|---|
| *B60L 53/62* | (2019.01) |
| *B60L 53/12* | (2019.01) |
| *B60L 53/30* | (2019.01) |
| *B60L 53/66* | (2019.01) |
| *B60L 55/00* | (2019.01) |
| *B60L 58/13* | (2019.01) |

(52) U.S. Cl.
CPC ............... *B60L 53/62* (2019.02); *B60L 53/30* (2019.02); *B60L 53/66* (2019.02); *B60L 55/00* (2019.02); *B60L 58/13* (2019.02); *B60L 53/12* (2019.02)

(58) Field of Classification Search
CPC .......... B60L 53/62; B60L 55/00; B60L 53/66; B60L 58/13; B60L 53/30; B60L 53/12
USPC ......................................................... 320/109
See application file for complete search history.

(56) References Cited

U.S. PATENT DOCUMENTS

| | | | | |
|---|---|---|---|---|
| 10,243,415 | B1 * | 3/2019 | Grundmann | ............ H02J 50/80 |
| 10,814,736 | B2 * | 10/2020 | Van Wiemeersch | .... B60L 53/66 |

(Continued)

FOREIGN PATENT DOCUMENTS

| | | | | |
|---|---|---|---|---|
| CN | 110901421 | A | 3/2020 | |
| CN | 116803737 | A * | 9/2023 | ................ H02J 7/92 |

(Continued)

*Primary Examiner* — Suresh Memula
(74) *Attorney, Agent, or Firm* — Finnegan, Henderson, Farabow, Garrett and Dunner, LLP

(57) ABSTRACT

A power supply system includes: a power supply facility configured to receive power supply from an external power source and execute power supply to a vehicle traveling in a traveling lane; and a vehicle management apparatus configured to manage a plurality of vehicles configured to use the power supply facility, select adjustment vehicles used for power adjustment of the external power source from among the plurality of vehicles, and when any one of the selected adjustment vehicles has reached a predetermined position in the traveling lane, release the one of the adjustment vehicles that has reached the predetermined position from the power adjustment of the external power source.

14 Claims, 12 Drawing Sheets

(56)       References Cited

U.S. PATENT DOCUMENTS

| | | | |
|---|---|---|---|
| 12,255,453 B2 * | 3/2025 | Guo | G06Q 30/0283 |
| 2016/0023557 A1 * | 1/2016 | Dimke | B60L 5/005 |
| | | | 320/108 |
| 2019/0039470 A1 * | 2/2019 | Moghe | B60L 53/00 |
| 2020/0262305 A1 * | 8/2020 | Chakraborty | B60L 53/57 |
| 2020/0373767 A1 * | 11/2020 | Schweitzer | B60L 53/14 |
| 2021/0300189 A1 | 9/2021 | Treadway et al. | |
| 2023/0009678 A1 * | 1/2023 | Mendes | B60L 58/15 |
| 2023/0038012 A1 * | 2/2023 | Erozlu | G01C 21/3679 |
| 2023/0088624 A1 * | 3/2023 | Salter | B60L 58/13 |
| | | | 701/117 |
| 2023/0219447 A1 * | 7/2023 | Ehara | B60L 53/68 |
| 2023/0219448 A1 * | 7/2023 | Ehara | B60L 53/68 |
| | | | 320/109 |
| 2023/0226923 A1 * | 7/2023 | Ehara | B60L 53/12 |
| | | | 191/2 |
| 2023/0246448 A1 * | 8/2023 | Ehara | H02J 3/322 |
| | | | 320/109 |
| 2023/0278451 A1 * | 9/2023 | Ehara | B60L 53/63 |
| | | | 320/109 |
| 2023/0302937 A1 * | 9/2023 | Takasaki | B60L 53/62 |
| 2024/0253511 A1 * | 8/2024 | Hashimoto | B60L 53/66 |
| 2025/0065765 A1 * | 2/2025 | Gaither | G06F 3/1423 |

FOREIGN PATENT DOCUMENTS

| | | | | | |
|---|---|---|---|---|---|
| JP | 2015-095983 A | | 5/2015 | | |
| JP | 2023003180 A | * | 1/2023 | | H02J 50/10 |
| KR | 20230135069 A | * | 9/2023 | | G06N 3/0464 |
| KR | 20250176565 A | * | 12/2025 | | H02J 50/90 |
| WO | WO-2011016736 A2 | * | 2/2011 | | B60L 53/126 |
| WO | WO-2019112585 A1 | * | 6/2019 | | B60W 60/005 |
| WO | WO-2025144764 A1 | * | 7/2025 | | B60L 53/12 |

* cited by examiner

FIG. 3

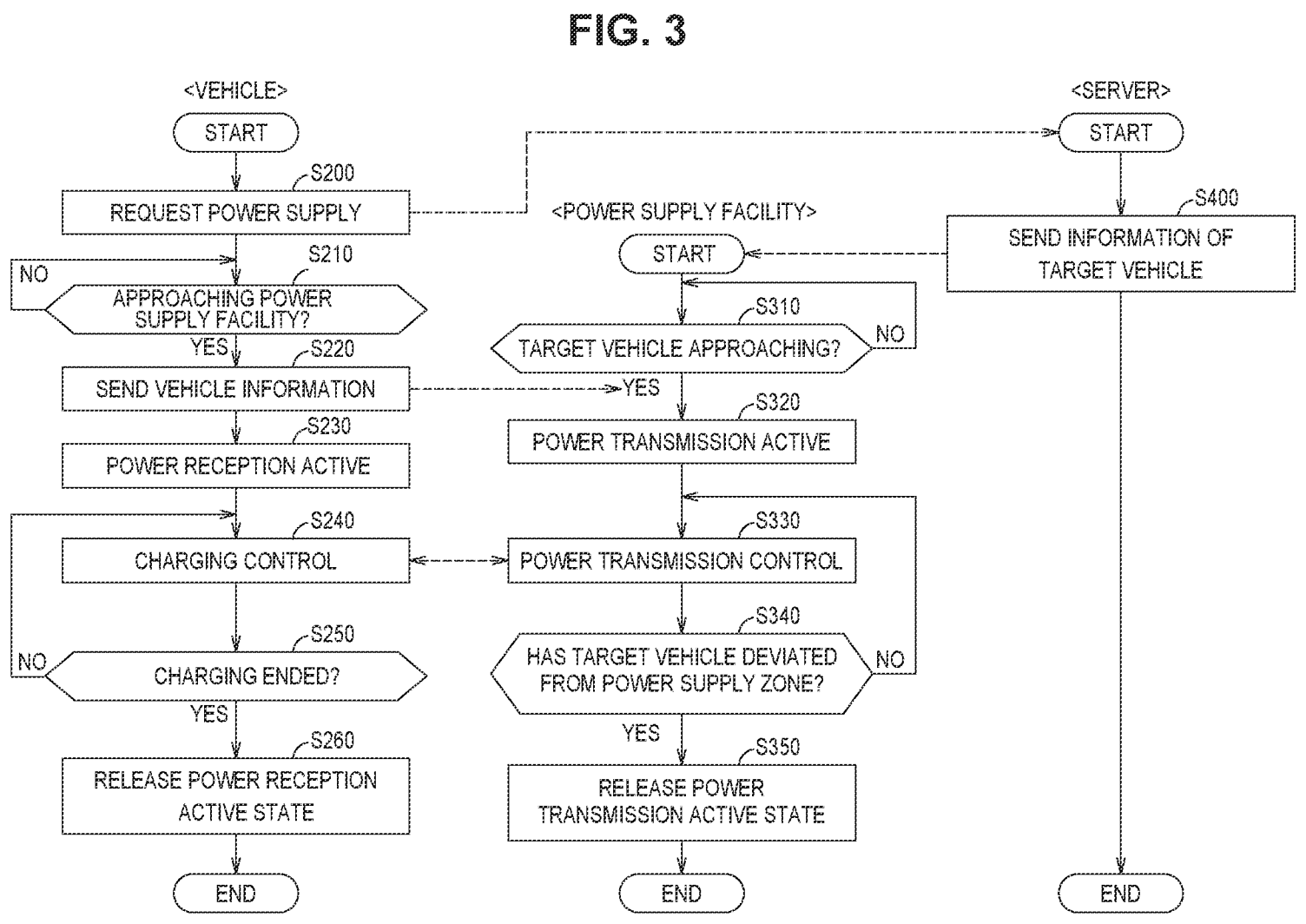

<SERVER>

START

S400 — SEND INFORMATION OF TARGET VEHICLE

END

<POWER SUPPLY FACILITY>

START

S310 — TARGET VEHICLE APPROACHING? — NO

YES

S320 — POWER TRANSMISSION ACTIVE

S330 — POWER TRANSMISSION CONTROL

S340 — HAS TARGET VEHICLE DEVIATED FROM POWER SUPPLY ZONE? — NO

YES

S350 — RELEASE POWER TRANSMISSION ACTIVE STATE

END

<VEHICLE>

START

S200 — REQUEST POWER SUPPLY

S210 — APPROACHING POWER SUPPLY FACILITY? — NO

YES

S220 — SEND VEHICLE INFORMATION

S230 — POWER RECEPTION ACTIVE

S240 — CHARGING CONTROL

S250 — CHARGING ENDED? — NO

YES

S260 — RELEASE POWER RECEPTION ACTIVE STATE

END

FIG. 5

<<AGGREGATOR SERVER>>

START

ESTIMATE NUMBER OF VPP VEHICLES — S11

PREDICT ADJUSTMENT FORCE OFFERABLE BY POWER SUPPLY LANE — S12

BID — S13

WIN BID — S14

ADJUSTMENT FORCE REQUEST GENERATED — S15

END

<<AGGREGATOR SERVER>>

ADJUSTMENT FORCE
REQUEST GENERATED → START

S51 — ACQUIRE M VPP VEHICLES

S52 — ACQUIRE LANE POWER

S53 — DECIDE TARGET ADJUSTMENT FORCE

S54 — SELECT VEHICLES

S55 — EXECUTE POWER ADJUSTMENT

S56 — CONTROL SPARE VEHICLE

S57 — ADJUSTMENT PERIOD ENDED? — NO

YES

S58 — SEND NOTIFICATION

END

FIG. 10

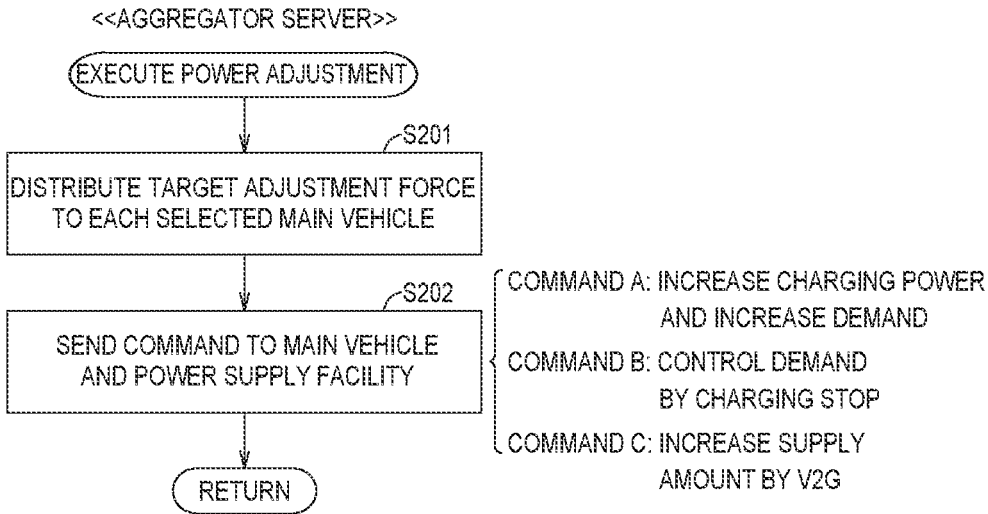

<<AGGREGATOR SERVER>>

EXECUTE POWER ADJUSTMENT

S201
DISTRIBUTE TARGET ADJUSTMENT FORCE TO EACH SELECTED MAIN VEHICLE

S202
SEND COMMAND TO MAIN VEHICLE AND POWER SUPPLY FACILITY

RETURN

COMMAND A: INCREASE CHARGING POWER AND INCREASE DEMAND

COMMAND B: CONTROL DEMAND BY CHARGING STOP

COMMAND C: INCREASE SUPPLY AMOUNT BY V2G

FIG. 11

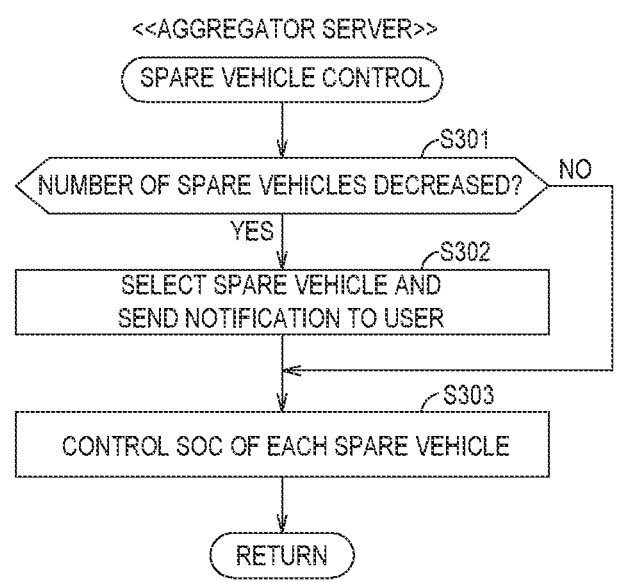

<<AGGREGATOR SERVER>>

SPARE VEHICLE CONTROL

S301
NUMBER OF SPARE VEHICLES DECREASED?    NO

YES

S302
SELECT SPARE VEHICLE AND SEND NOTIFICATION TO USER

S303
CONTROL SOC OF EACH SPARE VEHICLE

RETURN

<<RELEASED VEHICLE>>

START

S61
REACHED EXIT OF POWER SUPPLY LANE? — YES

NO

S62
CHARGING CONTROL TO TARGET SOC

S63
CHARGING COMPLETED TO TARGET SOC? — NO

YES

END

POWER SUPPLY SYSTEM, SERVER, AND POWER ADJUSTMENT METHOD

CROSS-REFERENCE TO RELATED APPLICATION

This application claims priority to Japanese Patent Application No. 2022-004972 filed on Jan. 17, 2022, incorporated herein by reference in its entirety.

BACKGROUND

1. Technical Field

The present disclosure relates to a power supply system, a server, and a power adjustment method.

2. Description of Related Art

For example, Japanese Unexamined Patent Application Publication No. 2015-95983 discloses execution of energy management through non-contact charging (power reception) or power supply by a vehicle parked inside premises of a residence.

SUMMARY

However, an xEV (for example, a battery electric vehicle or a plug-in hybrid electric vehicle) capable of accumulating power supplied from the outside of the vehicle can operate as an adjustment force of an external power source (for example, an adjustment force that causes power supply and demand to be level). Recently, a technique for supplying power to a traveling xEV has attracted attention, and thus it is conceivable that power adjustment of an external power source can be executed using such a technique. Hereinafter, a lane in which a power supply facility is provided is also referred to as a "power supply lane". The power supply lane is also generally referred to as a "charging lane".

By executing the power adjustment of the external power source by a vehicle traveling in the power supply lane, it is possible for the power supply lane to offer the adjustment force to the external power source. However, a vehicle (an adjustment vehicle) in the power supply lane selected for the power adjustment of the external power source may not always receive power from the power supply lane during the execution of the power adjustment of the external power source. The adjustment vehicle may be requested to stop charging or execute discharging for the power adjustment of the external power source. For this reason, the adjustment vehicle that has been executing the power adjustment of the external power source during traveling in the power supply lane may be in a power shortage state (a state where power for traveling is insufficient) after leaving the power supply lane.

In the present disclosure, it is difficult for a vehicle in a power supply lane selected for power adjustment of an external power source to be in a power shortage state after leaving the power supply lane.

A power supply system according to a first aspect of the present disclosure includes a power supply facility and a vehicle management apparatus. The power supply facility is configured to receive power supply from an external power source and execute power supply to a vehicle traveling in a traveling lane. The vehicle management apparatus is configured to manage a plurality of vehicles configured to use the power supply facility, select adjustment vehicles used for power adjustment of the external power source from among the plurality of vehicles, and when any one of the selected adjustment vehicles has reached a predetermined position in the traveling lane, release the one of the adjustment vehicles that has reached the predetermined position from the power adjustment of the external power source. Hereinafter, the traveling lane (the traveling lane in which the power supply facility as above is provided) is also referred to as a "power supply lane". The predetermined position is also referred to as a "release position".

A server according to a second aspect of the present disclosure includes a processor configured to manage a plurality of vehicles configured to use a power supply facility that receives power supply from an external power source and executes power supply to a vehicle traveling in a traveling lane, select adjustment vehicles used for power adjustment of the external power source from among the plurality of vehicles, and when any one of the selected adjustment vehicles has reached a predetermined position in the traveling lane, release the one of the adjustment vehicles that has reached the predetermined position from the power adjustment of the external power source.

A power adjustment method according to a third aspect of the present disclosure includes selecting adjustment vehicles used for power adjustment of an external power source from among vehicles traveling in a traveling lane provided with a power supply facility that receives power supply from the external power source, operating the adjustment vehicle used for the power adjustment of the external power source, and when any one of the selected adjustment vehicles has reached a predetermined position in the traveling lane, releasing the one of the adjustment vehicles that has reached the predetermined position from the power adjustment of the external power source.

With each aspect of the present disclosure, it is possible to make it difficult for a vehicle in a power supply lane selected for power adjustment of an external power source to be in a power shortage state after leaving the power supply lane.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating processing regarding power supply executed by the vehicle, the server, and the power supply facility illustrated in FIG. 2;

FIG. 5 is a plan view illustrating an overall configuration of a road illustrated in FIG. 4;

FIG. 10 is a flowchart illustrating details of processing regarding power adjustment illustrated in FIG. 8;

FIG. 11 is a flowchart illustrating details of a spare vehicle control illustrated in FIG. 8;

DETAILED DESCRIPTION OF EMBODIMENTS

Figure 1:
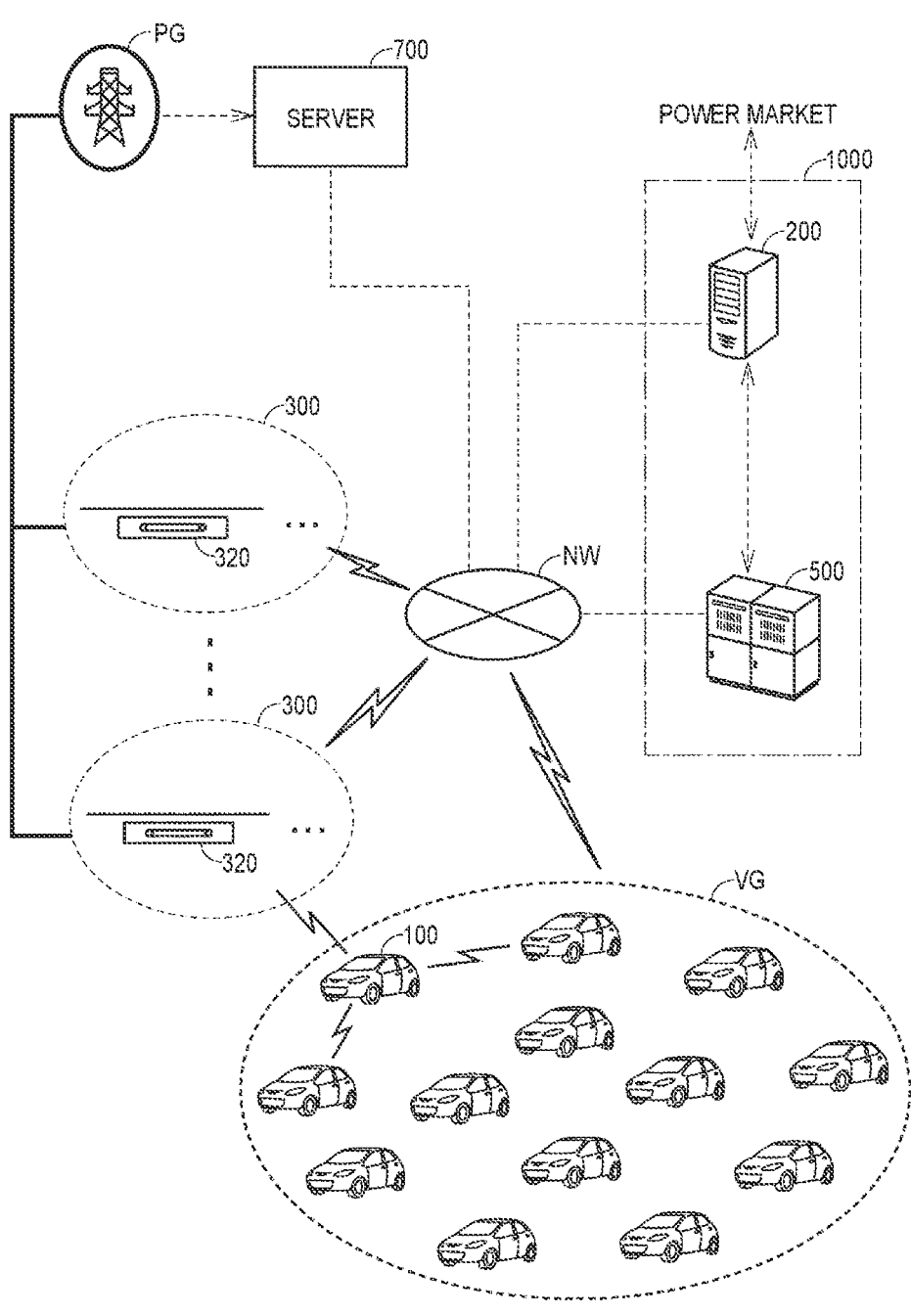
FIG. 1 is a diagram illustrating an overall configuration of a power supply system according to an embodiment of the present disclosure.

Hereinafter, embodiments of the present disclosure will be described in detail with reference to drawings. The same or corresponding parts in the drawings are denoted by the same reference signs and the description thereof will not be repeated.

FIG. 1 is a diagram illustrating an overall configuration of a power supply system according to an embodiment of the present disclosure. With reference to FIG. 1, the power supply system includes a vehicle management apparatus 1000 and a plurality of power supply facilities (hereinafter, when not distinguished from each other, each power supply facility is referred to as a "power supply facility 300"). The vehicle management apparatus 1000 includes servers 200, 500 communicable with each other. The server 200 corresponds to a computer (hereinafter, sometimes referred to as an "aggregator server") belonging to an aggregator.

A power system PG is a power network constructed by a power transmission/distribution facility. A plurality of power generation plants is connected to the power system PG. The power system PG receives power supply from the power generation plants. In this embodiment, a power company maintains and manages the power system PG (a commercial power source). The power company is a general power transmission/distribution business operator and corresponds to a transmission system operator (TSO). The power system PG supplies alternating current power (for example, three-phase alternating current power). The server 700 corresponds to a computer (hereinafter, sometimes referred to as a "TSO server") belonging to the TSO. The server 700 may be embedded with a middle supply system (a central power supply command center system) and a simple command system. The server 200 and the server 700 are configured to be communicable with each other via a communication network NW. The power system PG according to this embodiment corresponds to an example of an "external power source" according to the present disclosure.

The server 500 is configured to manage a vehicle group VG. The vehicle group VG includes a plurality of vehicles configured to be able to use the power supply facilities 300. The server 500 is configured to periodically communicate with each vehicle included in the vehicle group VG. The number of vehicles included in the vehicle group VG may be 10 or higher and lower than 100, 100 or higher and lower than 500, or 500 or higher. In this embodiment, it is assumed that the vehicle group VG includes approximately 200 vehicles. Hereinafter, when not distinguished from each other, each vehicle included in the vehicle group VG is referred to as a "vehicle 100". The vehicle 100 (a managed vehicle) is managed by the vehicle management apparatus 1000.

The power supply facility 300 includes a power transmission coil 320 provided in a road. The vehicle 100 is configured to receive the power supply from the power supply system (more specifically, the power transmission coil 320). The vehicle 100 is configured to be communicable with each of the servers 200, 500 via the communication network NW. The communication network NW is a wide area network constructed by, for example, the Internet and a wireless base station. Each of the servers 200 and 500 is connected to the communication network NW via, for example, a communication line. The server 200 and the server 500 may directly communicate with each other without going through the communication network NW, or may communicate with each other via the communication network NW. The power supply facility 300 is configured to be wirelessly communicable with the vehicles 100. The vehicles 100 included in the vehicle group VG may be configured to able to execute vehicle-to-vehicle communication (V2V communication) with each other. In this embodiment, the power supply facility 300 accesses the communication network NW via wireless communication and communicates with the server 200 via the communication network NW. However, the communication method is not limited thereto, and the server 200 and the power supply facility 300 may be directly connected to each other by a communication line and may communicate with each other without going through the communication network NW.

Figure 2:
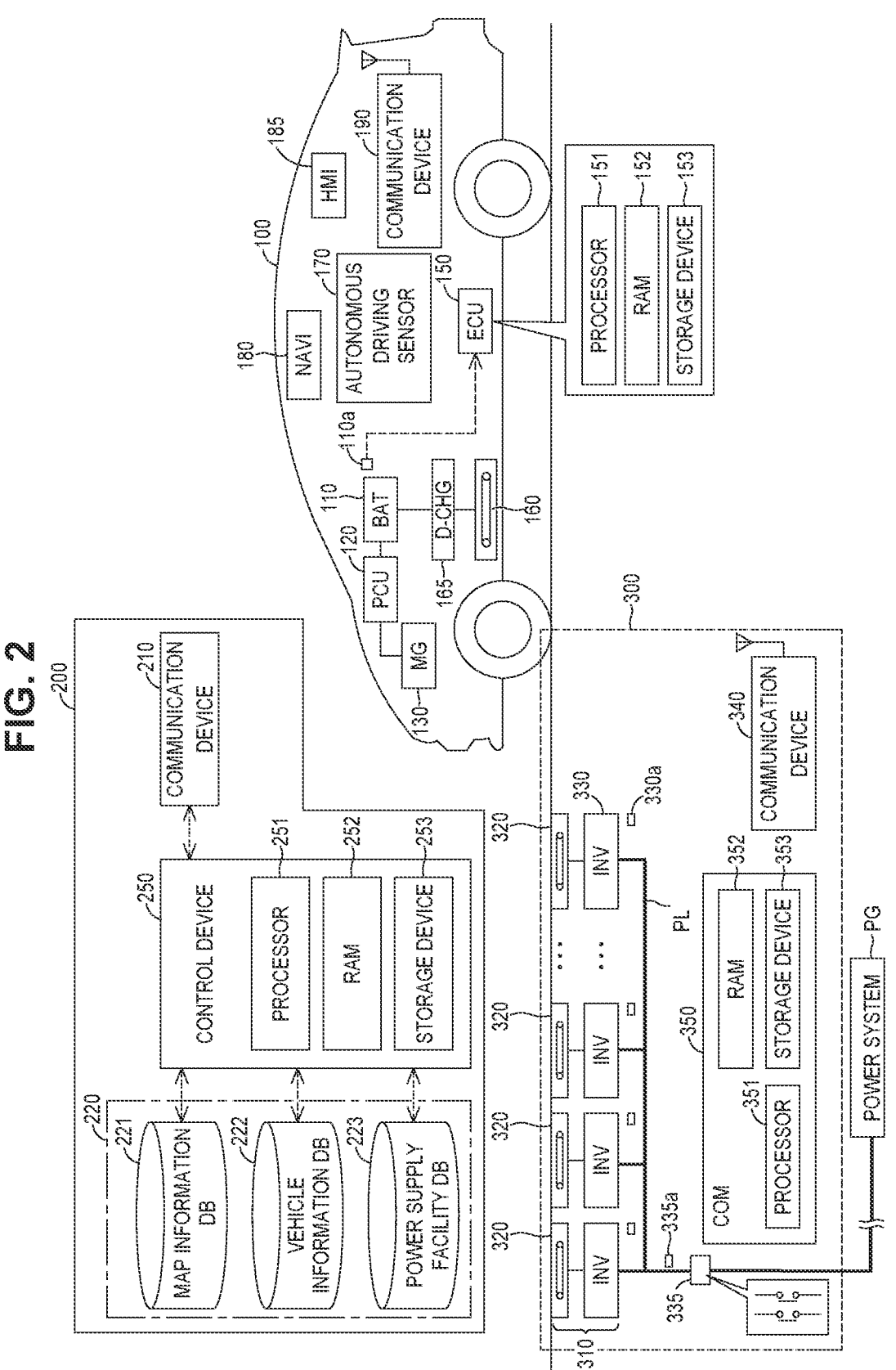
FIG. 2 is a diagram illustrating a configuration of each of a vehicle, a server, and a power supply facility illustrated in FIG. 1.

The vehicle 100 has a configuration illustrated in FIG. 2 described below. The vehicle 100 corresponds to an example of a target (a power supply target) to which the power supply facility 300 supplies power in the power supply system. FIG. 2 is a diagram illustrating a configuration of each of the vehicle 100, the server 200, and the power supply facility 300.

With reference to FIG. 2, the vehicle 100 includes a battery 110, a monitoring module 110$a$, a power control unit (PCU) 120, a motor generator (hereinafter, referred to as an "MG") 130, an electronic control device (hereinafter, referred to as an "ECU") 150, a power reception coil 160, a charger/discharger (D-CHG) 165, an autonomous driving sensor 170, a navigation system (hereinafter, referred to as a "NAVI") 180, a human machine interface (HMI) 185, and a communication device 190.

The ECU 150 is a computer including a processor 151, a random access memory (RAM) 152, and a storage device 153. The processor 151 may be a central processing unit (CPU). The RAM 152 functions as a working memory that temporarily stores data processed by the processor 151. The storage device 153 is configured to be able to retain stored information. In addition to a program, the storage device 153 stores information used in the program (for example, a map, a mathematical formula, and various parameters). In this embodiment, various controls are executed in the vehicle 100 when the processor 151 executes the program stored in the storage device 153. However, the present disclosure is not limited thereto, and the various controls may be executed by dedicated hardware (an electronic circuit).

The vehicle 100 includes a battery 110 that accumulates power for traveling. The vehicle 100 is configured to be able to travel using power accumulated in the battery 110. The vehicle 100 according to this embodiment is a battery electric vehicle (BEV) that does not include an engine (an internal combustion engine). As the battery 110, a known vehicle power accumulation device (for example, a liquid secondary battery, an all-solid-state secondary battery, or an assembled battery) can be employed. Examples of a secondary battery for a vehicle include a lithium-ion battery and a nickel-metal hydride battery. The monitoring module 110a includes various sensors that detect a state (for example, voltage, current, and a temperature) of the battery 110, and output detection results to the ECU 150. The monitoring module 110a may be a battery management system (BMS) further having a state-of-charge (SOC) estimation function, a state-of-health (SOH) estimation function, a cell voltage equalization function, a diagnosis function, and a communication function, in addition to the sensor function. The ECU 150 can acquire the state (for example, a temperature, current, voltage, an SOC, and internal resistance) of the battery 110 based on the output of the monitoring module 110a. The SOC indicates a remaining amount of power accumulated in a power accumulation device, and represents, for example, a ratio of a current power accumulation amount to a power accumulation amount in a fully charged state as 0% to 100%.

The PCU 120 includes, for example, an inverter, a converter, and a relay (hereinafter, referred to as "a system main relay (SMR)"). The PCU 120 is controlled by the ECU 150. The MG 130 may be, for example, a three-phase alternating current motor generator. The MG 130 is driven by the PCU 120 and is configured to cause drive wheels of the vehicle 100 to rotate. The PCU 120 drives the MG 130 using power supplied from the battery 110. Further, the MG 130 is configured to generate regenerative power and supply the generated power to the battery 110. The number of motors (MGs) for traveling is arbitrary, and may be one, two, or three or higher. The motor for traveling may be an in-wheel motor. The SMR is configured to switch between connection/disconnection of an electric circuit from the battery 110 to the MG 130. The SMR is switched to a closed state (a connected state) when the vehicle 100 travels.

In this embodiment, the power reception coil 160 is installed in a lower part of a vehicle body (for example, under a floor) of the vehicle 100. However, a position of the power reception coil 160 can be appropriately changed, and the power reception coil 160 may be provided in a vicinity of the wheel. The power reception coil 160 is configured to execute wireless power transfer (that is, power exchange in a non-contact manner) to the power transmission coil 320 of the power supply system. A method of the wireless power transfer (WPT) is arbitrary, and may be a magnetic field resonance method or an electromagnetic induction method. Further, another method may be employed. The charger/discharger 165 is positioned in an electric circuit from the power reception coil 160 to the battery 110. The charger/discharger 165 is configured to convert power supplied from the power supply system to the power reception coil 160 into power appropriate for charging the battery 110. Further, the charger/discharger 165 is configured to convert power of the battery 110 into power appropriate for external discharging (discharging by removing power therefrom to the outside of the vehicle).

The charger/discharger 165 includes, for example, an AC/DC conversion circuit that converts power in both directions, and a charging/discharging relay that switches between connection/disconnection of the electric circuit from the power reception coil 160 to the battery 110. The AC/DC conversion circuit converts alternating current power input from the power reception coil 160 into direct current power, and outputs direct current power to the battery 110. Further, the AC/DC conversion circuit converts direct current power input from the battery 110 into alternating current power, and outputs alternating current power to the power reception coil 160. The charger/discharger 165 may further include a DC/DC converter and a filter circuit. The charging/discharging relay is controlled by the ECU 150. The charging/discharging relay is basically in an open state (a disconnected state), but is switched to the closed state (the connected state) when the battery 110 is charged with power received by the power reception coil 160. Further, when the external discharging is executed through the power reception coil 160, the charging/discharging relay is also switched to the closed state (the connected state).

The vehicle 100 is configured to be chargeable during traveling. The charging of the vehicle 100 during the traveling is charging where power from the power supply system (more specifically, the power transmission coil 320) is input to the battery 110 via the power reception coil 160 and the charger/discharger 165 during the traveling of the vehicle 100. When the charging during the traveling is executed, the charging/discharging relay is switched to the closed state during the traveling of the vehicle 100.

The vehicle 100 is an autonomous driving vehicle configured to be able to autonomously drive. The vehicle 100 according to this embodiment is configured to be able to execute both manned traveling (traveling in a state where there is a person in the vehicle) and unmanned traveling (traveling in a state where there is no person in the vehicle). The vehicle 100 is configured to autonomously drive in an unmanned state, but can also be manually driven by a user (the manned traveling). The vehicle 100 may be configured to be able to travel in a row.

The autonomous driving sensor 170 is a sensor used for autonomous driving. However, when the autonomous driving is not executed, the autonomous driving sensor 170 may be used in a predetermined control. The autonomous driving sensor 170 includes a sensor (hereinafter, also referred to as an "external environment sensor") that acquires information for recognizing an environment of the outside of the vehicle 100, a sensor (hereinafter, also referred to as an "internal environment sensor") that acquires information for recognizing an environment of the inside of the vehicle 100, and a sensor (hereinafter, also referred to as a "behavior sensor") that acquires information on behavior of the vehicle 100. A detection result of each sensor is output to the ECU 150.

An example of the external environment sensor includes at least one of a camera directed to the outside of the vehicle, a millimeter-wave radar, and LiDAR. The ECU 150 can recognize the environment of the outside of the vehicle 100 based on an output of the external environment sensor. An example of the interior environment sensor includes at least one of a camera directed to the inside of the vehicle and an infrared sensor. The ECU 150 can determine whether the vehicle 100 is in a manned or unmanned state based on an output of the interior environment sensor. The autonomous driving sensor 170 may include a seating sensor or a seatbelt sensor as the interior environment sensor. An example of the behavior sensor includes at least one of an inertial measurement unit (IMU) and a global positioning system (GPS) sensor. The GPS sensor is a position sensor using a GPS. The autonomous driving sensor 170 may include at least one of a vehicle speed sensor, an acceleration sensor, and a yaw rate sensor as the behavior sensor. The ECU 150 can detect or predict a position and posture (a current state or a future state) of the vehicle 100 based on an output of the behavior sensor.

The NAVI 180 includes a GPS module and a storage device. The storage device stores map information. The GPS module is configured to receive a signal (hereinafter, referred to as a "GPS signal") from a GPS satellite (not shown). The NAVI 180 can specify the position of the vehicle 100 using the GPS signal. The NAVI 180 is configured to refer to the map information and search for a route in order to find an optimum route (for example, the shortest route) from a current position to a destination of the vehicle 100. The NAVI 180 may sequentially update the map information by executing the wireless communication with a data center. A user can set a traveling plan in the NAVI 180. When the traveling plan is set in the NAVI 180, the traveling plan is sent from the vehicle 100 to the server 500. The traveling plan may include at least one of a traveling route, a destination, and a traveling schedule (for example, an arrival time for each set place).

The HMI 185 includes an input device and a display device. The HMI 185 may include a touch panel display. The HMI 185 may include a smart speaker that receives a voice input. The HMI 185 may display various pieces of information input from the user and various pieces of information acquired from the outside of the vehicle (for example, the server 200). The HMI 185 may display the route that has been found by the NAVI 180.

The ECU 150 executes various controls (for example, a drive control, a braking control, and a steering control) for traveling of the vehicle 100. The ECU 150 is configured to execute the autonomous driving according to a predetermined autonomous driving program. The ECU 150 may execute the autonomous driving according to the traveling route and the traveling schedule set in the NAVI 180 by controlling an accelerator, a brake, and a steering device (none of which are shown) of the vehicle 100 using the various pieces of information acquired by the autonomous driving sensor 170. The autonomous driving program may be sequentially updated by over-the-air (OTA).

The communication device 190 includes a long-range communication module and a short-range communication module. The long-range communication module corresponds to a communication interface (I/F) for long-range communication. The long-range communication module includes, for example, a data communication module (DCM). Further, the long-range communication module may include a communication I/F corresponding to at least one of the Fifth Generation (5G) Mobile Communication System and WiMAX®. The long-range communication module is configured to be accessible to the communication network NW (a wide area network) illustrated in FIG. 1. The vehicle 100 (the ECU 150) is configured to access the communication network NW by the long-range communication module and execute the wireless communication with the server 200 via the communication network NW.

The short-range communication module corresponds to a communication I/F for short-range communication. The short-range communication has a shorter communication distance than the long-range communication. The communication distance of the short-range communication module may be shorter than 200 m, or may be 1 m or longer and 30 m or shorter. An example of the short-range communication includes communication by a wireless local area network (LAN), Bluetooth®, or ZigBee®. In the short-range communication, at least one of radio frequency identification (RFID) and dedicated short-range communication (DSRC) may be employed. The vehicle 100 (the ECU 150) is configured to execute the short-range wireless communication with the power supply facility 300 (more specifically, a communication device 340 described below) by the short-range communication module.

The communication device 190 may further include at least one of a communication module that executes the wireless communication between vehicles (V2V), a communication module that executes the wireless communication between a road and a vehicle (V2I), and a communication module that executes the wireless communication with a terminal (for example, a smartphone or a wearable device) brought into a vehicle.

The power supply facility 300 includes a plurality of power transmission coils 320 provided on a road, a power conversion circuit 330 provided for each power transmission coil 320, a monitoring module 330a provided for each power conversion circuit 330, a power supply relay 335, the communication device 340, a computer (hereinafter, referred to as a "COM") 350, and a power source line PL. The number of power transmission coils 320 included in the power supply facility 300 is arbitrary.

The power transmission coils 320 and a plurality of power conversion circuits 330 provided in the road compose a power supply circuit 310 that supplies power to a vehicle traveling on the road. The monitoring module 330a includes a power supply sensor that detects power input to and output from a corresponding power conversion circuit 330. The power conversion circuit 330 is electrically connected to a corresponding power transmission coil 320. Each power conversion circuit 330 included in the power supply circuit 310 is electrically connected to the power source line PL. The power source line PL is electrically connected to the power system PG via the power supply relay 335.

The COM 350 includes a processor 351 (for example, a CPU), a RAM 352, and a storage device 353. In addition to a program, the storage device 353 stores information used in the program (for example, a map, a mathematical formula, and various parameters). Details will be described below, but, when the power supply to the power supply facility 300 is reserved, information (for example, identification information) on the vehicle that has reserved the power supply is stored in the storage device 353. In this embodiment, various controls are executed in the power supply facility 300 when the processor 351 executes the program stored in the storage device 353. However, the present disclosure is not limited thereto, and the various controls may be executed by dedicated hardware (an electronic circuit).

The power conversion circuit 330 includes, for example, an inverter (INV) that executes power conversion in both directions. The power supply relay 335 is configured to switch between connection/disconnection of a power supply path. The power conversion circuit 330 and the power supply relay 335 are controlled by the COM 350. The power supply relay 335 is basically in the open state (the disconnected state), but is switched to the closed state (the connected state) when the WPT is executed by the power transmission coil 320. In the WPT from the power supply facility 300 to the vehicle (the power supply lane), the power conversion circuit 330 receives the power supply from the power source line PL, generates power for the WPT, and outputs the generated power to the power transmission coil 320. Further, the power conversion circuit 330 executes a reverse tide flow on the power system PG by converting, according to the power of the power source line PL, the power received by the power transmission coil 320 by the WPT from the vehicle (the power supply lane) to the power supply facility 300.

The monitoring module 330a includes various sensors (for example, a current sensor, a voltage sensor, and a temperature sensor) that detect a state of a corresponding power conversion circuit 330, and outputs detection results to the COM 350. The monitoring module 330a is configured to detect output power of the power conversion circuit 330 supplied to the vehicle on the road via the power transmission coil 320 and input power of the power conversion circuit 330 input to the power conversion circuit 330 from the vehicle on the road via the power transmission coil 320. Specifically, the monitoring module 330a includes a current sensor and a voltage center that detect power input to and output from the corresponding power conversion circuit 330.

A power amount meter 335a is provided on the power source line PL. The power amount meter 335a measures a transition of a total value of power input to and output from all the power conversion circuits 330 included in the power supply facility 300. The power amount meter 335a measures an amount adjusted (ΔkW) for each power supply facility. The power amount meter 335a may be a smart meter. The power amount meter 335a measures a power amount for a passage of every predetermined time, stores the measured power amount, and sends the measured power amount to the server 200.

In the same manner as the above-described communication device 190, the communication device 340 includes a long-range communication module and a short-range communication module. The power supply facility 300 (the COM 350) is configured to access the communication network NW by the long-range communication module and execute the wireless communication with the server 200 via the communication network NW. Further, the power supply facility 300 (the COM 350) is configured to execute the short-range wireless communication with the vehicle 100 (more specifically, the communication device 190 described below) by the short-range communication module. For this reason, when the vehicle 100 is close to the power supply facility 300, information can be exchanged between the two by the short-range wireless communication.

The server 200 includes a communication device 210, a database 220, and a control device 250. The communication device 210 is configured to communicate with each of the vehicle 100 and the power supply facility 300 via the communication network NW. The control device 250 is configured to bidirectionally exchange information with each of the power supply facility 300 (the COM 350) and the vehicle 100 (the ECU 150).

The control device 250 includes a processor 251 (for example, a CPU), a RAM 252, and a storage device 253. In addition to a program, the storage device 253 stores information used in the program (for example, a map, a mathematical formula, and various parameters). In this embodiment, various processes are executed in the server 200 when the processor 251 executes the program stored in the storage device 253. However, the present disclosure is not limited thereto, and the various processes may be executed by dedicated hardware (an electronic circuit).

The database 220 includes a map information database 221, a vehicle information database 222, and a power supply facility database 223. Hereinafter, the database will be referred to as a "DB".

The vehicle information DB 222 stores information on each vehicle registered in the server 200. In this embodiment, a plurality of vehicles 100 included in the vehicle group VG (see FIG. 1) is registered in the server 200, and information on the vehicles 100 is managed in the vehicle information DB 222. The vehicle information DB 222 associates information (hereinafter, also referred to as "vehicle information") on the vehicle with information for identifying the vehicle (hereinafter, also referred to as a "vehicle ID") and individually manages the information. The vehicle information includes, for example, information indicating a specification of the vehicle (for example, a vehicle type, a fully charged capacity, rated charging power, and rated discharging power), a state of the vehicle system (for example, being operating, being stopped, and an abnormality occurrence), a position of the vehicle, a traveling situation (for example, the manned traveling, the unmanned traveling, and vehicle speed), a traveling plan (for example, a destination), information on the autonomous driving (for example, a target value of a traveling control), and a state of the power accumulation device (for example, the SOC), information on a power supply request (for example, the presence/absence of a request and requested power), information on a charging rate, and information on a record of the power adjustment (for example, an incentive and a penalty according to the record of the power adjustment).

The power supply facility DB 223 stores information on each power supply facility registered in the server 200. In this embodiment, a plurality of power supply facilities 300 is registered in the server 200, and information on the power supply facilities 300 is managed in the power supply facility DB 223. The power supply facility DB 223 associates information (hereinafter, also referred to as "facility information") on the power supply facility 300 with information for identifying the power supply facility (hereinafter, also referred to as a "facility ID") and individually manages the information. The facility information includes, for example, information indicating a specification of the power supply facility 300 (for example, a manufacturer, a model number, a power supply method, and rated supply power), information on a position of the power supply facility 300, information on a record of the power supply (for example, the vehicle ID of a power supply target), and maintenance information (for example, inspection time, part replacement time, and usage history).

Map information is stored in the map information DB 221. The map information indicates various roads in a predetermined area. The control device 250 may refer to the map information DB 221, the vehicle information DB 222, and the power supply facility DB 223, and grasp positions of the vehicle and the power supply facility on the map, respectively. The server 200 may further acquire traffic congestion information and weather information in each area from the outside. The traffic congestion information and the weather information may be offered on the communication network NW by, for example, a known service. The map information DB 221, the vehicle information DB 222, and the power supply facility DB 223 are updated with the latest information periodically or at a predetermined timing. In this embodiment, the server 500 sequentially receives predetermined vehicle information (for example, the position of the vehicle, the traveling situation, and the state of the power accumulation device) from each vehicle included in the vehicle group VG. The server 200 may send a request to the server 500 for vehicle information and update the vehicle information DB 222 with the latest vehicle information received from the server 500, as needed.

In the power supply system illustrated in FIG. 1, the power supply facility 300 is configured to supply power to the traveling vehicle 100 in a non-contact manner. FIG. 3 is a flowchart illustrating processing executed by the vehicle 100, the power supply facility 300, and the server 200 when the vehicle 100 receives the power supply from the power supply facility 300. Hereinafter, each step in the flowchart is simply referred to as "S".

With reference to FIGS. 1, 2, and 3, first, in S200, the vehicle 100 (the ECU 150) sends a power supply request to the server 200. The power supply request (S200) is sent when a predetermined condition (hereinafter, referred to as a "power supply start condition") is satisfied. For example, when the user executes a predetermined input (an input requesting power supply) to the HMI 185 while the vehicle 100 is traveling in a manned manner, the power supply start condition may be satisfied.

In the power supply request (S200), the ECU 150 sends a predetermined power supply request signal to the server 200. The power supply request signal includes the identification information (the vehicle ID) of the vehicle 100 and requested power (kW). The ECU 150 may designate a power supply facility of which a request of the power supply is made and send the power supply request. In this case, the ECU 150 sends the power supply request signal including information for specifying the power supply facility (for example, the facility ID and/or the position) to the server 200. Hereinafter, the vehicle 100 that has sent the power supply request to the server 200 will be referred to as a "target vehicle".

Upon receiving the power supply request signal from the target vehicle, the server 200 executes a process of S400. In S400, the control device 250 specifies the power supply facility of which the request of the power supply has been made by the target vehicle, and sends a predetermined power supply reservation signal to the specified power supply facility. When a power supply facility has not been designated by the power supply request signal, the control device 250 may specify the power supply facility of which the request of the power supply is made by the target vehicle, using the vehicle information of the target vehicle (for example, the position of the vehicle, the traveling plan, and the SOC of the battery 110). The control device 250 may send a power supply reservation signal to one or more power supply facilities positioned on, for example, the planned traveling route of the target vehicle. In this case, the position information of the power supply facility reserved for the power supply may be sent from the server 200 to the target vehicle, and the traveling route including the power supply facility may be set in the NAVI 180 of the target vehicle. When the traveling route including the reserved power supply facility is set in the NAVI 180, the target vehicle may start the autonomous driving toward the reserved power supply facility according to the traveling route.

The power supply reservation signal includes information on the target vehicle (for example, the vehicle ID and the requested power). The control device 250 may add, to the power supply reservation signal, the vehicle information extracted from the vehicle information DB 222 based on the vehicle ID indicated by the power supply request signal. Hereinafter, the power supply facility reserved for the power supply (that is, the power supply facility to which the server 200 has sent the power supply reservation signal) is referred to as a "target facility". In this embodiment, the power supply facility 300 illustrated in FIG. 2 is the target facility.

When the target facility (the power supply facility 300) receives the power supply reservation signal, the vehicle information (for example, the vehicle ID and the requested power) included in the power supply reservation signal is registered in the target facility, and a process of S310 is executed. When the server 200 sends the power supply reservation signal to a plurality of power supply facilities 300, a series of processes (S310 to S350) illustrated in FIG. 3 is executed on each target facility (the power supply facility 300). Further, when one power supply facility 300 receives power supply reservation signals from a plurality of vehicles 100, the target facility (the power supply facility 300) executes a series of processes (S310 to S350) illustrated in FIG. 3 on each target vehicle.

In S310, the COM 350 of the target facility determines whether the target vehicle has approached the communication device 340 of the target facility provided on the road. The communication device 340 is configured to be able to execute the short-range communication with the vehicle 100. Hereinafter, a range in which the target facility is able to execute the short-range communication is also referred to as a "power supply zone". The fact that the vehicle 100 is present in the power supply zone means that the vehicle 100 has approached the target facility (including the power supply circuit 310 and the communication device 340). Upon receiving the vehicle ID of the target vehicle by the short-range communication, the COM 350 determines YES in S310. While the target vehicle is not approaching (NO in S310), the determination in S310 is repeatedly executed. When the approach of the target vehicle is not confirmed even after a predetermined time has passed from the reservation of the power supply (the reception of the power supply reservation signal), the COM 350 may end a series of processes illustrated in FIG. 3 and cancel the reservation.

When the target vehicle (the vehicle 100) approaches the target facility (YES in S210) after sending the power supply request signal (S200), the short-range communication between the target facility and the target vehicle is started. Then, in S220, the ECU 150 of the target vehicle sends a predetermined power supply start signal to the target facility by the short-range communication. The power supply start signal includes identification information (a vehicle ID) of the target vehicle. The continuation of the short-range communication between the target facility and the target vehicle means that the target vehicle is present in the power supply zone of the target facility.

When the target facility (the power supply facility 300) receives the power supply start signal, the COM 350 of the target facility checks the vehicle ID registered by the power supply reservation signal against the vehicle ID included in the power supply start signal. Then, when the two match, the determination in S310 is YES, and the process proceeds to S320. In S320, the COM 350 sets the power supply circuit 310 to a power transmission active state (a WPT possible state). As such, power is supplied from the power conversion circuit 330 to the power transmission coil 320. During the power transmission, the power supply relay 335 is maintained in the closed state (the connected state). When the power reception coil 160 of the vehicle 100 is present above the power transmission coil 320, WPT is executed from the target facility to the vehicle 100. The COM 350 may control the power supply circuit 310 and the power supply relay 335 such that the power transmission is started at a timing of passing the vehicle after authentication by the vehicle ID. Subsequently, in S330, the COM 350 executes a power transmission control. Specifically, the COM 350 controls the power conversion circuit 330 (the inverter) such that the power corresponding to the requested power of the target vehicle is supplied to the power transmission coil 320. A detected value of the power supply by the monitoring module 330*a* during the power supply is sequentially recorded in the storage device 353 together with an acquisition time.

On the other hand, in S230, the ECU 150 of the target vehicle sets the charger/discharger 165 to a power reception active state (a chargeable state during the traveling) after sending the power supply start signal (S220). As such, the charging/discharging relay is closed (connected), and power from the target facility (the power supply facility 300) is input to the battery 110 via the power reception coil 160 and the charger/discharger 165 of the target vehicle. Subsequently, in S240, the ECU 150 executes a charging control of the battery 110. Specifically, the ECU 150 controls the charger/discharger 165 such that power (charging power) input to the battery 110 becomes close to the requested power (kW). Further, the ECU 150 controls vehicle speed of the target vehicle based on a requested power amount (kWh). A power amount input to the battery 110 becomes larger as the vehicle speed of the target vehicle is slower. Using the detected values of the voltage and the current of the battery 110, the ECU 150 can calculate received power (kW) from the target facility and a received power amount (kWh) obtained by time-integrating the received power.

Subsequently in S250, the ECU 150 of the target vehicle determines whether the charging of the battery 110 has been ended. For example, when a charging amount reaches the requested power amount, or when the battery 110 is fully charged, it is determined that the charging has been ended. Alternatively, when the short-range communication with the target facility is interrupted (that is, when the target vehicle leaves the power supply zone), it is determined that the charging has been ended. While the charging is not ended (NO in S250), the battery 110 is charged in S240.

On the other hand, when the charging has been ended (YES in S250), in S260, the ECU 150 of the target vehicle releases the power reception active state of the charger/discharger 165. As such, the charger/discharger 165 is stopped and the charging/discharging relay is switched to the open state (the disconnected state). When the process of S260 is executed, charging processing in the target vehicle is ended.

In S340, the COM 350 of the target facility determines whether the target vehicle has deviated from the power supply zone, and, while the target vehicle is present in the power supply zone (NO in S340), executes the power transmission in S330. Then, when the target vehicle deviates from the power supply zone (YES in S340), in S350, the COM 350 releases the power transmission active state of the power supply circuit 310. As such, the power conversion circuit 330 (the inverter) is stopped, and the power supply to the power transmission coil 320 is stopped. In S350, the power supply relay 335 may be switched to the open state (the disconnected state), or may be maintained in the closed state (the connected state) in preparation for a next vehicle. When the process of S350 is executed, power transmission processing in the target facility is ended.

In this embodiment, the power supply facility 300 detects the approach of the vehicle 100 based on whether the short-range communication between the vehicle 100 and the power supply facility 300 has been established. However, the method of detecting the approach of the vehicle is not limited to such a method, and is arbitrary. For example, a sensor installed in or around the road may detect the approach of the vehicle.

Figure 4:
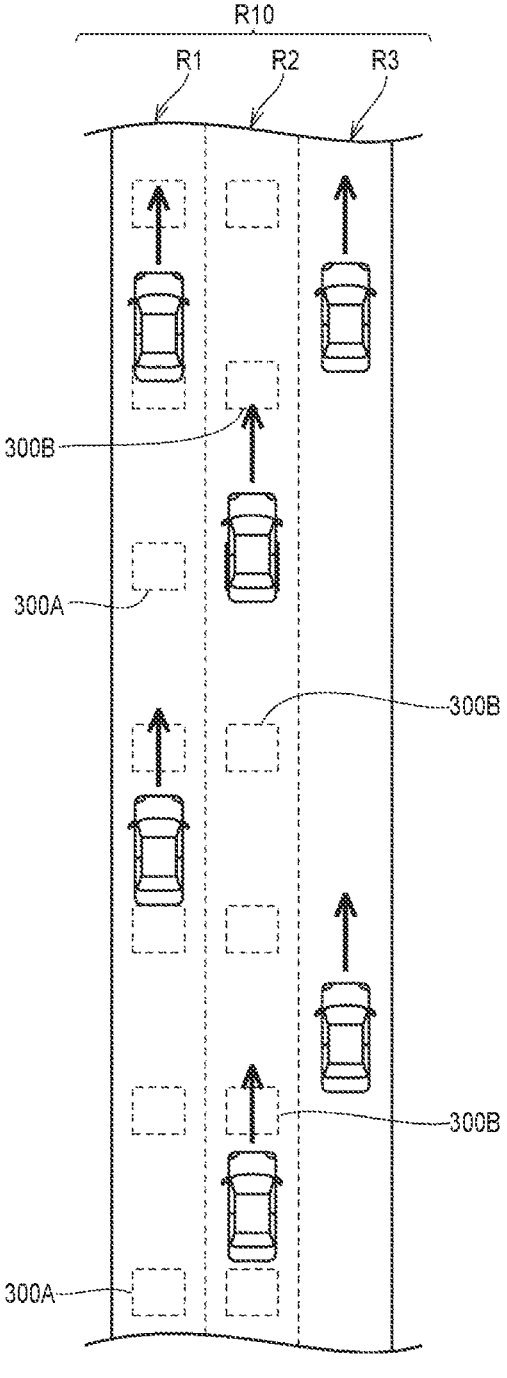
FIG. 4 is a diagram for describing an arrangement mode of the power supply facility according to the embodiment of the present disclosure.

FIG. 4 is a diagram for describing an arrangement mode of the power supply facilities according to this embodiment. With reference to FIG. 4, a road R10 includes three traveling lanes R1 to R3. Each of the traveling lanes R1 and R2 corresponds to a power supply lane, and the traveling lane R3 corresponds to a non-power supply lane. The traveling lane R2 is positioned between the traveling lanes R1 and R3. In this embodiment, the power supply lanes (the traveling lanes R1, R2) and the non-power supply lane (the traveling lane R3) are provided on the same road R10.

The power supply system according to this embodiment includes a plurality of power supply facilities 300A and a plurality of power supply facilities 300B embedded in the road R10. The power supply facilities 300A are arranged in the traveling lane R1 at predetermined intervals. The power supply facilities 300B are arranged in the traveling lane R2 at predetermined intervals. Distances between the power supply facilities 300A in the traveling lane R1 and distances between the power supply facilities 300B in the traveling lane R2 may be the same or different. Each of the power supply facilities 300A and the power supply facilities 300B has the same configuration as the power supply facility 300 illustrated in FIG. 2. The power supply facility 300A is configured to receive the power supply from the power system PG and supply power to the vehicle traveling in the traveling lane R1. The power supply facility 300B is configured to receive the power supply from the power system PG and supply power to the vehicle traveling in the traveling lane R2. Each of the traveling lanes R1 and R2 corresponds to an example of the "traveling lane" according to the present disclosure. Each of the power supply facilities 300A and 300B corresponds to an example of the "power supply facility" according to the present disclosure.

Figure 5:
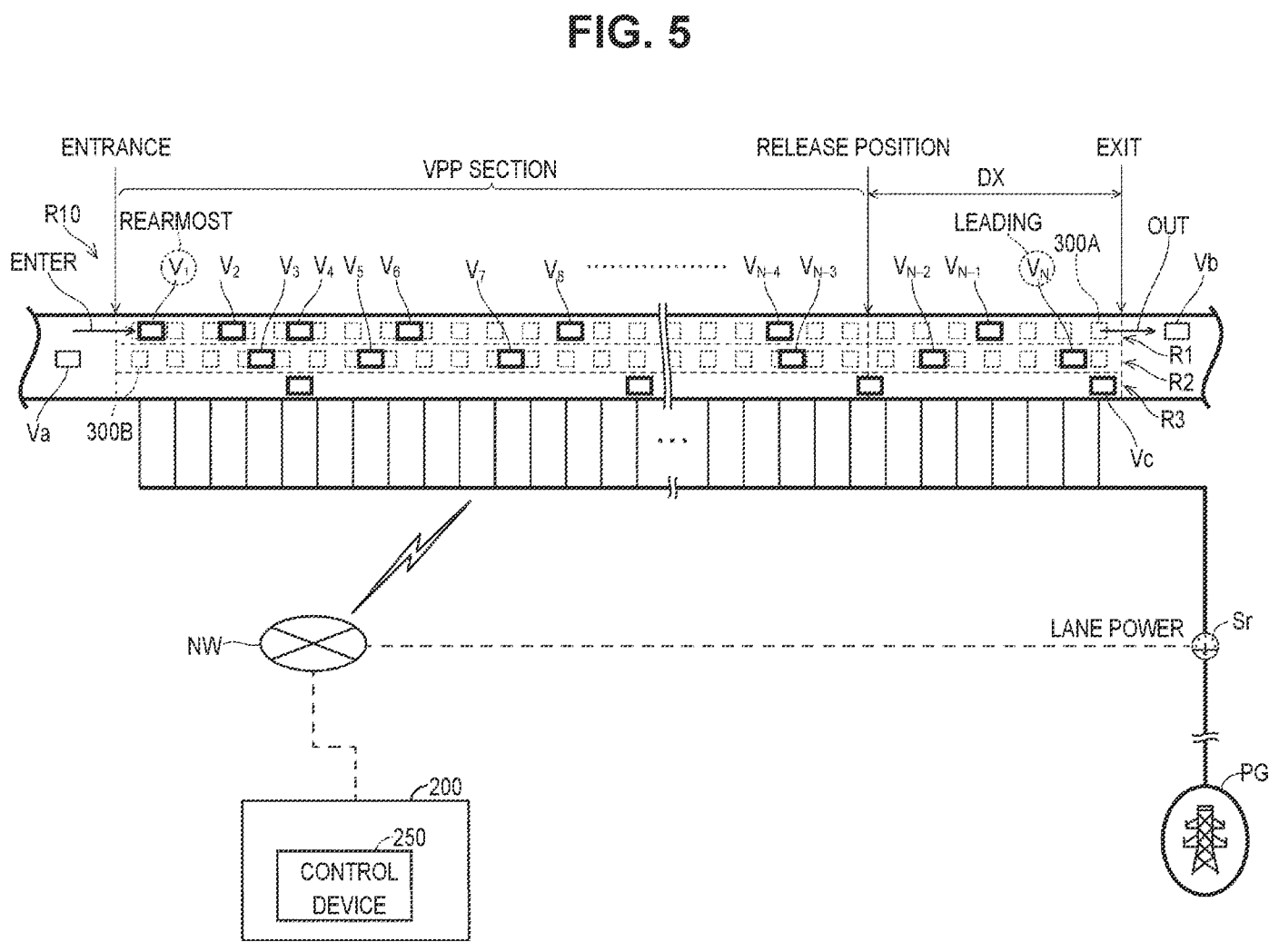

FIG. 5 is a plan view illustrating an overall configuration of the road R10 illustrated in FIG. 4. With reference to FIG. 5 together with FIGS. 1 and 2, the road R10 has entrances and exits of the power supply lanes. The power supply lanes (the traveling lanes R1, R2) are provided in a range from the entrances to the exits on the road R10. In the example illustrated in FIG. 5, each vehicle traveling on the road R10 is the vehicle 100 (see FIG. 2) included in the vehicle group VG (see FIG. 1). The control device 250 of the server 200 is configured to be communicable with each vehicle traveling on the road R10 and each of the power supply facilities 300A and 300B via the communication network NW. Hereinafter, among the vehicles 100 traveling on the road R10, the vehicle 100 traveling in the power supply lane is also referred to as a "power supply lane vehicle".

The vehicle traveling in any one of the traveling lanes R1, R2 corresponds to the power supply lane vehicle. In the example illustrated in FIG. 5, N power supply lane vehicles are present in the power supply lanes (the traveling lanes R1, R2). In FIG. 5, these power supply lane vehicles are represented as $V_1$, $V_2$, $V_3$, $V_4$, . . . , $V_{N-3}$, $V_{N-2}$, $V_{N-1}$, and $V_N$. The subscript of "V" indicates a vehicle number from the rearmost vehicle. For example, $V_5$ is the fifth power supply lane vehicle from the rearmost vehicle. A vehicle $V_a$ before the entrance of the power supply lane does not correspond to the power supply lane vehicle. A vehicle $V_b$ that has passed the exit of the power supply lane does not correspond to the power supply lane vehicle, either. A vehicle (for example, a vehicle $V_c$) traveling in the traveling lane R3 (the non-power supply lane) does not correspond to the power supply lane vehicle, either.

A power amount meter Sr is provided between the power system PG and the power supply lanes (the traveling lanes R1, R2) of the road R10. The power amount meter Sr measures a transition of a total value of power input to and output all the power supply facilities (the power supply facilities 300A, 300B) provided in the power supply lanes of the road R10. The power amount meter Sr sequentially measures and sequentially records each of a total power input from the power system PG to the power supply lanes of the road R10 and a total power output from the power supply lanes of the road R10 to the power system PG. The power amount meter Sr measures an amount (ΔkW) adjusted by the power supply lane of the road R10. The power amount meter Sr may be a smart meter. The power amount meter Sr measures a power amount for a passage of every predetermined time, stores the measured power amount, and sends the measured power amount to the server 200. Hereinafter, the power detected by the power amount meter Sr is also referred to as "lane power".

When an adjustment force request is generated (that is, when the power adjustment of the power system PG is requested), the control device 250 of the server 200 executes vehicle selection for selecting adjustment vehicles (that is, vehicles that operate or stand by to offer the adjustment force) for the power adjustment of the power system PG from among the vehicle group VG (see FIG. 1). Details will be described below, but in this embodiment, the control device 250 selects, as the adjustment vehicles, one or more main vehicles used for securing the requested adjustment force and one or more spare vehicles used for executing the power adjustment instead of the main vehicle when the main vehicle stops the power adjustment of the power system PG during the power adjustment. Then, when any one of the selected adjustment vehicles reaches a predetermined position (a release position in FIG. 5) in the power supply lane of the road R10, the control device 250 releases the adjustment vehicle that has reached the release position from the power adjustment of the power system PG. After being released from the power adjustment, the power supply lane vehicle can secure power for traveling after leaving the power supply lane by receiving power from the power supply lane. For this reason, the vehicle that has executed the power adjustment of the external power source is restricted from being in a power shortage state (a state where power for traveling is insufficient) after leaving the power supply lane.

The release position may be set at, for example, an end part of the power supply lane. A distance Dx from the exit of the power supply lane to the release position can be arbitrarily set. The distance Dx may be a fixed value or a variable value. The distance Dx may be common to all power supply lane vehicles, or may be set for each power supply lane vehicle. The details will be described below, but in this embodiment, the server 200 decides the distance Dx for each power supply lane vehicle using the vehicle information for each power supply lane vehicle. Hereinafter, a section from the entrance to the release position in the power supply lane of the road R10 is referred to as a "VPP section". Further, the vehicle 100 traveling on the VPP section of the road R10 (that is, the vehicle 100 that has not reached the release position in the power supply lane of the road R10) is also referred to as a "VPP vehicle".

In this embodiment, the adjustment force request is generated when the control device 250 wins a bid for the adjustment force of the power system PG in the power market. In the market, a transaction of power as a product is executed. Each product is bought and sold by, for example, a bidding method. A transaction of the adjustment force of the power system PG is also executed in the power market. The adjustment force gives the power system PG flexibility (an ability to change generation or consumption of power in response to power fluctuations). In the power market, a transaction of a product is executed per frame, in which one day is divided into each unit time. In this embodiment, a transaction is executed for 48 frames in which one day is divided into 30-minute units. A market closing time for each frame is referred to as "gate closing (GC)". In this embodiment, the GC is one hour before a frame start time.

The aggregator executes electronic commerce using the server 200. The server 200 executes a transaction of the adjustment force in the power market. Accounting for a market transaction is managed by the server 200. Upon winning a bid for the adjustment force in the power market, the server 200 generates the adjustment force request corresponding to the adjustment force for which the bid has been won.

Figure 6:
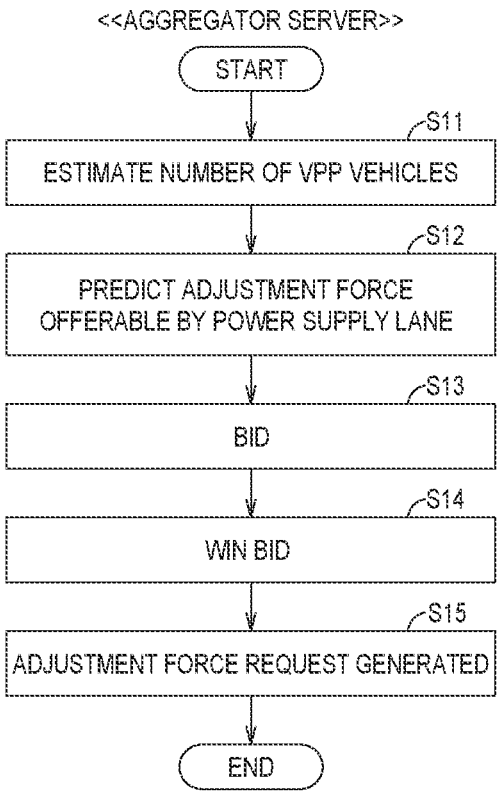
FIG. 6 is a flowchart illustrating processing regarding a market transaction executed by a vehicle management apparatus illustrated in FIG. 1.

FIG. 6 is a flowchart illustrating processing regarding a market transaction executed by the server 200. The processing illustrated in the flowchart is executed when a predetermined condition is satisfied. The predetermined condition may be satisfied at a predetermined time or may be periodically satisfied. When the server 200 receives a bid instruction from the user, the predetermined condition may be satisfied. The server 200 decides a timing appropriate for the bidding based on at least one of a market price, weather information (including weather forecast information), and a demand history of the vehicle group VG, and executes the processing illustrated in FIG. 6 at the timing appropriate for the bidding. The power market may be, for example, a spot market (a day-ahead market). However, the power market is not limited thereto, and may be a pre-hour market (an intra-day market), a supply and demand adjustment market, or a capacity market.

With reference to FIG. 6 together with FIGS. 1, 2, and 5, in S11, the control device 250 of the server 200 estimates the number of VPP vehicles in a predetermined period (for example, a frame corresponding to each product). Hereinafter, the predetermined period is also referred to as a "transaction target period". The control device 250 may estimate the number of vehicles using the vehicle information (for example, the traveling plan) managed by the vehicle information DB 222. The control device 250 may estimate the number of vehicles based on the degree of congestion of the power supply lane that is predicted from traffic information. The server 200 may acquire the traffic information via Vehicle Information and Communication System (VICS)®.

Subsequently in S12, the control device 250 predicts the adjustment force offerable by the power supply lanes (the traveling lanes R1, R2) of the road R10 during the transaction target period, using the number of VPP vehicles estimated in S11. The adjustment force (an upper limit value of the adjustment force) offerable by the power supply lane of the road R10 during the transaction target period becomes larger as the number of VPP vehicles estimated in S11 is larger. The control device 250 may predict the adjustment force further using information (for example, at least one of a full charging capacity, rated charging power, and rated discharging power) on a charging/discharging specification of each vehicle 100 that is estimated to be present in the power supply lane of the road R10 during the transaction target period.

Subsequently in S13, the control device 250 selects a transaction target using the adjustment force predicted in S12, and bids for the selected transaction target. Then, in S14, the control device 250 receives, from a market manager, a notification indicating that its bid for a product (the adjustment force) has been won. Thereafter, when a start time of the adjustment force (a start time of the transaction target period) for which the bid has been won arrives, in S15, the control device 250 generates the adjustment force request corresponding to the adjustment force for which the bid has been won. As above, the server 200 may be configured to estimate the number of vehicles 100 that have not reached release positions in the power supply lane of the road R10 for the predetermined period (S11), and bids for the adjustment force for the predetermined period in the power market using the estimated number of vehicles 100 (S13).

When the adjustment force request is generated in S15, the server 200 (the aggregator) is requested to offer the adjustment force for the transaction target period. In other words, the transaction target period becomes the adjustment period (the period for which the offering of the adjustment force is requested). The aggregator (a winning bidder) who has won the bid for the adjustment force adjusts power within a range of a winning bid amount (ΔkW, a contracted amount) with respect to a reference value (kW). The winning bid amount may be positive (an upper adjustment force) or negative (a lower adjustment force). The winning bidder sends, to the market manager, a notification indicating the reference value by the time of GC (one hour before the start time of a frame for which the bid has been won). The market manager is notified, in advance, of the power supply lane of the road R10 as a resource (for example, a list pattern) used for the power adjustment. The server 200 executes the power adjustment using the power supply lane of the road R10 in one or more frames (the adjustment period) for which the bid has been won. The server 200 controls the lane power (power detected by the power amount meter Sr) according to, for example, a command from the server 700 (the TSO server). When an output command value is changed during the adjustment period, the server 200 changes the output (the lane power) of the power supply lane to the changed value within a response time of a product requirement. When the output command value is maintained at the same value during the adjustment period, the server 200 continues the output (the lane power) of the power supply lane according to the command for at least a continued time of the product requirement. After the end of the entire frame for which the bid has been won, the server 200 sends record data of the power adjustment in the frame to the server 700.

Separate from the above-described market transaction, the aggregator is responsible for simultaneously achieving a commensurate amount regarding the power system PG. The aggregator corresponds to a balance responsible party (BRP). In this embodiment, a planned value simultaneous/commensurate amount rule is employed. The aggregator submits, in advance, the planned value for each frame to a predetermined organization. In this embodiment, a length of the frame (a unit time) is 30 minutes. The predetermined organization may be an organization for cross-regional coordination of transmission operator (OCCTO). A deadline for changing the planned value (a deadline for submitting a supply and demand planned value) in the planned value simultaneous/commensurate amount rule is the GC (one hour before the frame), and the planned value cannot be changed after the CC. An imbalance in the simultaneous/commensurate amount (a mismatch with the planned value) is evaluated for each frame. The aggregator that has caused the imbalance is responsible for paying an imbalance fee (a penalty).

Figure 7:
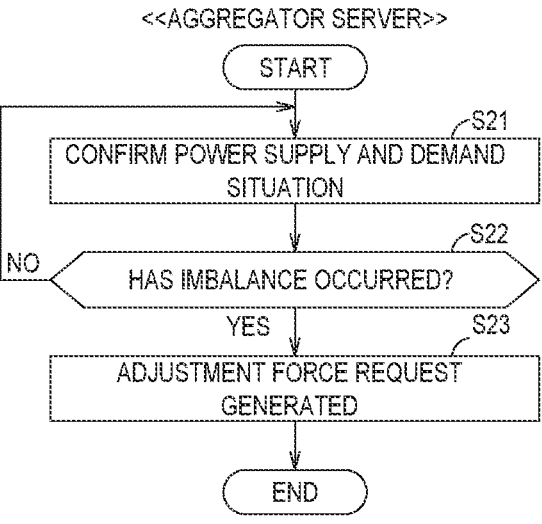
FIG. 7 is a flowchart illustrating processing regarding monitoring of a supply and demand balance executed by the vehicle management apparatus illustrated in FIG. 1.

The aggregator monitors the supply and demand balance (the simultaneous/commensurate amount) of the power system PG using the server 200. FIG. 7 is a flowchart illustrating processing regarding the monitoring of the supply and demand balance executed by the server 200. The processing illustrated in the flowchart may be started at a start time of a predetermined frame (a frame to be monitored).

With reference to FIG. 7 together with FIGS. 1, 2, and 5, in S21, the control device 250 of the server 200 acquires actual supply and demand in a relationship between the aggregator (more specifically, each resource managed by the aggregator) and the power system PG. The actual supply and demand may include at least one of a power amount (a power demand amount) received from the power system PG and used by the aggregator, and a power amount (a power supply amount) supplied by the aggregator to the power system PG. The actual supply and demand is detected by, for example, a sensor in each resource (including the power supply lane of the road R10) managed by the aggregator.

Subsequently in S22, the control device 250 determines whether the imbalance in the simultaneous/commensurate amount of the power system PG exceeds a predetermined permissible range in the frame to be monitored. While the imbalance is within the permissible range (NO in S22), the processes of S21 and S22 are repeated. Then, when the imbalance exceeds the permissible range (YES in S22), in S23, the control device 250 generates the adjustment force request for eliminating the imbalance.

The imbalance in the simultaneous/commensurate amount corresponds to, for example, a difference between the planned value of the supply and demand and the actual value of the supply and demand. For example, when demand forecasting diverges and the actual value of the demand (power consumption) is higher than the planned value, the imbalance in the simultaneous/commensurate amount occurs. Further, when power generation forecasting (for example, forecasting of power generated by solar power generation or wind power generation) diverges and the actual value of the supply (generated power) is higher than the planned value, the imbalance in the simultaneous/commensurate amount also occurs.

When the adjustment force request is generated in S23, the server 200 (the aggregator) is requested to offer the adjustment force in the frame to be monitored. In other words, the frame to be monitored (30 minutes) becomes the adjustment period. The server 200 adjusts the actual supply and demand using the power supply lane of the road R10 such that the imbalance with respect to the planned value (kWh) in the frame to be monitored becomes sufficiently small.

Figure 8:
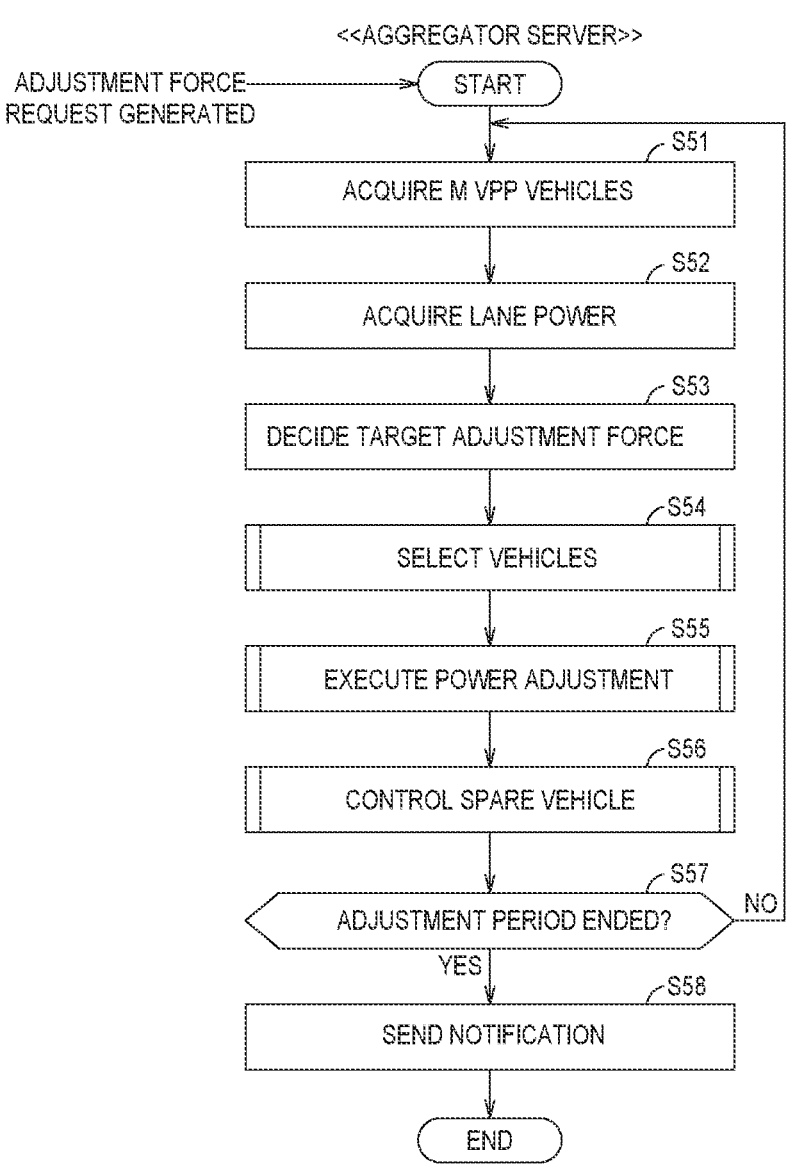
FIG. 8 is a flowchart illustrating a power adjustment method according to the embodiment of the present disclosure.

When the adjustment force request occurs in S15 of FIG. 6 or S23 of FIG. 7, the server 200 starts a series of processes illustrated in FIG. 8. FIG. 8 is a flowchart illustrating a power adjustment method according to this embodiment.

With reference to FIG. 8 together with FIGS. 1, 2, and 5, in S51, the control device 250 of the server 200 acquires the number of VPP vehicles (hereinafter, referred to as a "number M"). FIG. 5 illustrates an example in which the number M (the number of vehicles 100 traveling in the VPP section of the road R10) is 10 or higher, but the number M changes every time depending on a situation of entry/exit of the vehicles 100 into/from the power supply lanes. Depending on the situation of the power supply lanes, the number M may be lower than 10.

The control device 250 may detect the number M using the vehicle information (for example, a position of the vehicle 100) managed by the vehicle information DB 222. The control device 250 can acquire the latest data from the server 500. The control device 250 may detect the number M using the information acquired from the power supply facility 300. For example, each power supply facility (the power supply facilities 300A, 300B) provided in the power supply lanes of the road R10 may sequentially send, to the server 200, a vehicle ID of a vehicle that has passed the power supply facility, together with a facility ID of the power supply facility.

The control device 250 may detect the number M using the information acquired from the road R10 or the vehicle 100 traveling on the road R10. For example, the control device 250 may detect the number M using a sensor or a camera (for example, the N-system or a traffic counter) provided in the road R10. Alternatively, a first communication device (not shown) provided near the entrance of the power supply lane on the road R10 may execute the wireless communication with the vehicle 100 that has newly entered the power supply lane. The first communication device may send, to the vehicle, a notification indicating that it has entered the power supply lane, receive the vehicle ID of the vehicle (the vehicle ID of the rearmost vehicle), and send the vehicle ID of the rearmost vehicle to the server 200. Alternatively, a second communication device (not shown) provided near the release position of the power supply lane on the road R10 may execute the wireless communication with the vehicle 100 that has reached the release position. The second communication device may send, to the vehicle (the vehicle 100 that has reached the release position), a notification indicating that it has reached the release position, receive the vehicle ID from the vehicle, and send the vehicle ID to the server 200. Alternatively, a third communication device (not shown) provided near the exit of the power supply lane on the road R10 may execute the wireless communication with the vehicle 100 that has exited the power supply lane. The third communication device may send, to the vehicle (the exiting vehicle that has been a leading vehicle until immediately before exiting), a notification indicating that it has left the power supply lane, receive the vehicle ID (the vehicle ID of the exiting vehicle) of the vehicle, and send the vehicle ID of the exiting vehicle to the server 200. Further, the vehicles 100 in the power supply lane of the road R10 may exchange information (for example, a vehicle ID and a vehicle position) by vehicle-to-vehicle communication (V2V communication) with each other. Information indicating a surrounding situation of each vehicle 100 in the power supply lane may be sent from each vehicle 100 to the server 200.

Subsequently in S52, the control device 250 acquires the lane power (power detected by the power amount meter Sr). Subsequently in S53, the control device 250 decides a target adjustment force using the lane power and the requested adjustment force (a magnitude of the adjustment force requested by the generated adjustment force request). Regarding the adjustment force request caused by the won bid in the power market, the control device 250 may decide the target adjustment force based on, for example, the requested adjustment force indicated by the command from the server 700 (the TSO server) and the lane power detected in the power amount meter Sr. Regarding the adjustment force request caused by the imbalance in the simultaneous/commensurate amount, the control device 250 may decide the target adjustment force based on, for example, the planned value, the actual supply and demand, and the lane power.

Figure 9:
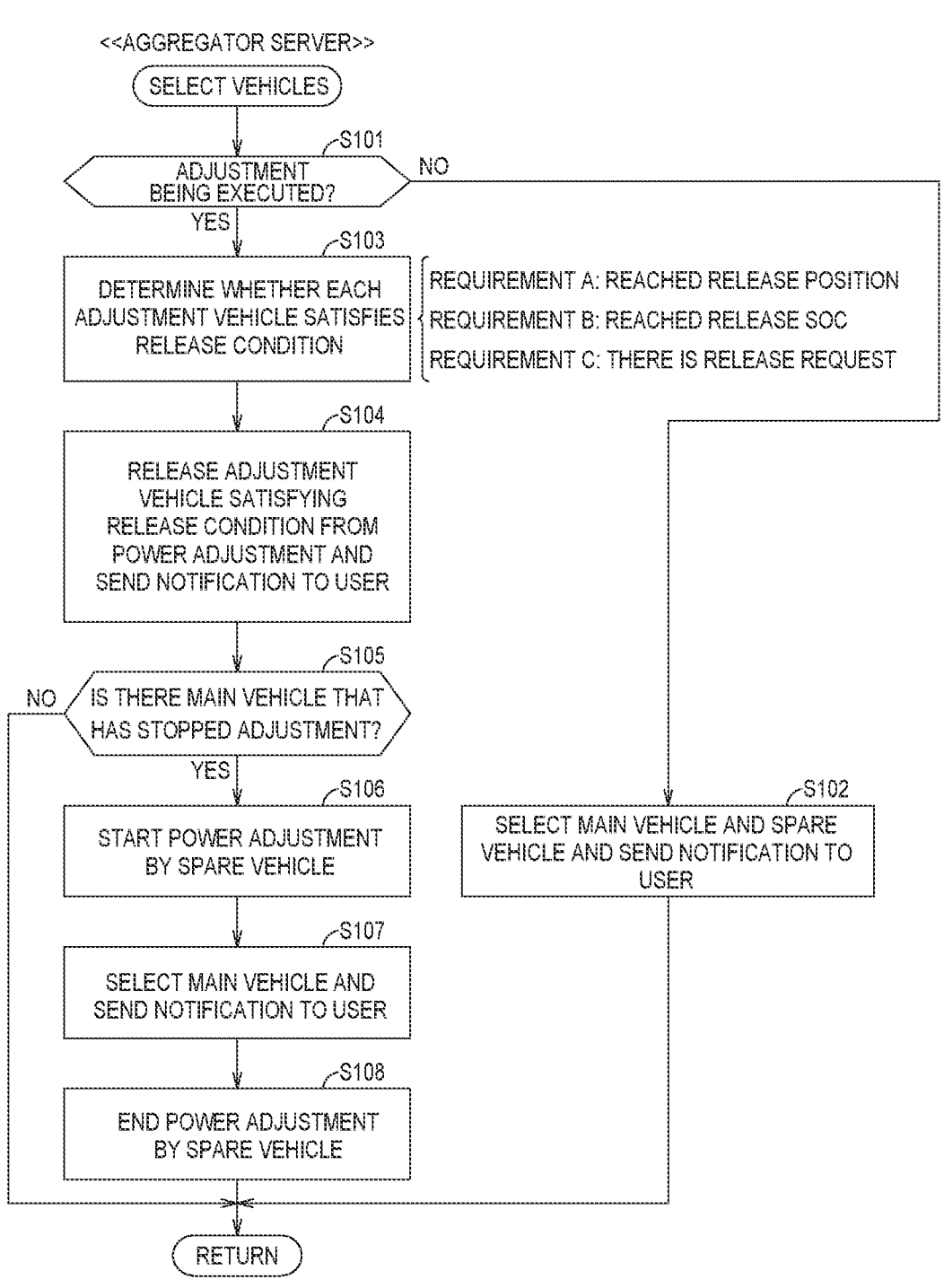
FIG. 9 is a flowchart illustrating details of processing regarding a vehicle selection illustrated in FIG. 8.

Subsequently in S54, the control device 250 executes vehicle selection. FIG. 9 is a flowchart illustrating details of the vehicle selection.

With reference to FIG. 9 together with FIGS. 1, 2, and 5, in S101, the control device 250 determines whether the power supply lane of the road R10 is executing the power adjustment of the power system PG. In a first processing routine, it is determined that the power adjustment of the power system PG has not started yet (NO in S101), and the process proceeds to S102. In S102, the control device 250 selects adjustment vehicles (the vehicles 100 used for the power adjustment of the power system PG) from among the VPP vehicles. Specifically, the control device 250 selects the main vehicle and the spare vehicle as the adjustment vehicles.

The control device 250 selects, from among the M VPP vehicles, the necessary number of the main vehicles to secure the target adjustment force (in more detail, the target adjustment force that has been decided based on the magnitude of the requested adjustment force). Based on the vehicle information (for example, the full charging capacity, the SOC, the rated charging power, and the rated discharging power of the battery 110) of each VPP vehicle, the control device 250 may select one or more main vehicles that meet the generated adjustment force request. By operating each selected main vehicle as the adjustment force of the power system PG, the target adjustment force is achieved.

Further, the control device 250 selects one or more spare vehicles from among the remaining selection candidates excluding the vehicle 100 selected as the main vehicle from among the M VPP vehicles. The spare vehicle is an adjustment vehicle (that is, an adjustment vehicle used for responding to a disturbance) that stands by in preparation for an emergency. When any one of the main vehicles stops the power adjustment of the power system PG caused by any factor during the power adjustment (for example, a deviation from the power supply lane during the power adjustment, insufficient power accumulation capacity, and failure), the spare vehicle executes the power adjustment instead of the main vehicle. Based on the vehicle information (for example, the full charging capacity, the SOC, the rated charging power, and the rated discharging power of the battery 110) of each VPP vehicle, the control device 250 may select one or more spare vehicles that meet the generated adjustment force request.

When the selection of the adjustment vehicles (the main vehicle and the spare vehicle) is ended, the control device 250 sends a notification indicating a start of the power adjustment to a user terminal of each selected adjustment vehicle. The user terminal may be a terminal mounted on the vehicle or a mobile terminal carried by the vehicle user. In this embodiment, on each selected adjustment vehicle, a charging/discharging control (that is, a charging/discharging control for the power adjustment of the power system PG) is executed by the processes illustrated in FIG. 10 or FIG. 11 described below, without the execution of the processes illustrated in FIG. 3. On the other hand, the power supply lane vehicles that have not been selected as the adjustment vehicles can receive power supply from the power supply lanes (the traveling lanes R1, R2) of the road R10 by the processes illustrated in FIG. 3. The power supply lane vehicles that have been selected as the adjustment vehicles can also receive the power supply from the power supply lanes (the traveling lanes R1, R2) of the road R10 by the processes illustrated in FIG. 12 described below after being released from the power adjustment of the power system PG.

When the selection of the adjustment vehicles and the sending of the notification to the vehicle user (S102) are ended in the first processing routine, the process proceeds to S55 of FIG. 8. In S55, the control device 250 executes the power adjustment of the power system PG. FIG. 10 is a flowchart illustrating details of the power adjustment.

With reference to FIG. 10 together with FIGS. 1, 2, and 5, in S201, the control device 250 distributes the target adjustment force to each main vehicle. For example, when the target adjustment force is the adjustment force on the charging side (that is, when the charging for the power adjustment is requested), the control device 250 decides charging power for each main vehicle. The control device 250 may decide charging power for each main vehicle based on the vehicle information (for example, the SOC and the rated charging power of the battery 110) of each main vehicle. The control device 250 may allocate large charging power to a main vehicle having large rated charging power and a main vehicle having a low SOC. On the other hand, when the target adjustment force is the adjustment force on the discharging side (that is, when the discharging for the power adjustment is requested), the control device 250 decides discharging power for each main vehicle. The discharging power allocated to the main vehicle may be 0 kW (charging stop). The control device 250 may decide the discharging power for each main vehicle based on the vehicle information (for example, the SOC and the rated discharging power of the battery 110) of each main vehicle. The control device 250 may allocate large discharging power to a main vehicle having large rated discharging power and a main vehicle having a high SOC.

Subsequently in S202, the control device 250 sends a command (hereinafter, referred to as an "adjustment command") for operating each main vehicle according to the adjustment force (the charging power or the discharging power) decided in S201 to each of the main vehicles traveling in the power supply lanes (the traveling lanes R1, R2) of the road R10 and each of the power supply facilities (the power supply facilities 300A, 300B) provided in the power supply lanes of the road R10. The adjustment command is sent to the power supply facilities 300A, 300B, together with the vehicle IDs of the main vehicles.

The power adjustment by the WPT executed between the main vehicle and the power supply facility 300 (the power supply facility 300A or 300B) is executed in a manner similar to the processes illustrated in FIG. 3. However, in S240, the main vehicle executes the charging/discharging control according to the adjustment command from the server 200 (the control device 250). Upon receiving the vehicle ID from the main vehicle by the short-range communication (YES in S310), in S330, the power supply facility 300 executes the charging/discharging control according to the adjustment command corresponding to the vehicle ID. Each main vehicle traveling in the power supply lane of the road R10 executes the power adjustment of the power system PG by executing the charging control, the discharging control, or a charging stop control according to the adjustment command from the server 200. The control device 250 can increase the demand of the power system PG by sending, to the main vehicle, a command (a command A) for increasing the charging power of the battery 110 in the main vehicle. Alternatively, the control device 250 can restrict the demand of the power system PG from being increased by sending, to the main vehicle, a command (a command B) for prohibiting the battery 110 in the main vehicle from being charged. Alternatively, the control device 250 can increase the supply of the power system PG by sending, to the main vehicle, a command (a command C) for executing Vehicle-to-Grid (V2G) from the main vehicle to the power system PG.

When the charging is requested by the generated adjustment force request, the control device 250 sends, to each main vehicle, an adjustment command (a first command) for executing the charging by the charging power decided in S201. Upon receiving the adjustment command (the first command) for executing the charging by the charging power decided in S201, the main vehicle (the ECU 150) charges the battery 110 with the power from the power supply facility 300 according to the adjustment command. On the other hand, when the discharging is requested by the generated adjustment force request, the control device 250 sends, to each main vehicle, an adjustment command (a second command) for executing the discharging by the discharging power decided in S201 or the charging stop. Upon receiving the adjustment command (the second command) for executing the discharging by the discharging power decided in S201 or the charging stop, the main vehicle (the ECU 150) discharges the battery 110 by removing power therefrom to the power system PG or stops charging the battery 110 according to the adjustment command. As such, the lane power is controlled according to the generated adjustment force request.

When the process of S202 is executed, a series of processes illustrated in FIG. 10 is ended, and the process proceeds to S56 of FIG. 8. In S56, the control device 250 executes a spare vehicle control. FIG. 11 is a flowchart illustrating details of the spare vehicle control.

With reference to FIG. 11 together with FIGS. 1, 2, and 5, in S301, the control device 250 determines whether the number of spare vehicles has been decreased. The decreased number of spare vehicles is counted based on a state of the previous processing routine.

Specifically, the control device 250 monitors whether the spare vehicle is traveling in the power supply lane of the road R10 during the adjustment period. The control device 250 may grasp a traveling position of each spare vehicle using the vehicle information (for example, the position of the vehicle) managed by the vehicle information DB 222. The control device 250 can sequentially acquire the latest data from the server 500. In each of a case where the spare vehicle has exited from the exit of the supply lane (the traveling lane R1 or R2) and a case where the spare vehicle has changed lanes from the power supply lane (the traveling lane R1 or R2) to the non-power supply lane (the traveling lane R3), the control device 250 determines that the spare vehicle has deviated from the power supply lane. Then, thereafter, the control device 250 does not recognize the spare vehicle that has deviated from the power supply lane (the traveling lane R1 or R2) of the road R10 as the spare vehicle. Further, the control device 250 does not recognize the spare vehicle released from the power adjustment of the power system PG in S104 of FIG. 9 described below as the spare vehicle, either. Further, when the server 200 receives an abnormality signal (a signal indicating that an abnormality has occurred in a vehicle) from any one of the spare vehicles, the control device 250 does not recognize the vehicle as the spare vehicle, either. In this embodiment, the previously selected spare vehicle is no longer the spare vehicle due to a deviation from the power supply lane, a release from the power adjustment, or an occurrence of an abnormality, and the number of spare vehicles is decreased.

In all of the case where the spare vehicle traveling in the power supply lane of the road R10 in the previous processing routine has deviated from the power supply lane, the case where the spare vehicle has been released from the power adjustment of the power system PG in S104 of FIG. 9, and the case where an abnormality has occurred in the spare vehicle, a determination in S301 is YES, and the process proceeds to S302. In S302, the control device 250 selects a spare vehicle from among the VPP vehicles (that is, the vehicle 100 that has not reached the release position in the power supply lane of the road R10). Based on the vehicle information (for example, the full charging capacity, the SOC, the rated charging power, and the rated discharging power of the battery 110) of each VPP vehicle, the control device 250 may select a spare vehicle that meets the generated adjustment force request. In this embodiment, the control device 250 selects (supplements) a spare vehicle by the decreased number in S302. However, the present disclosure is not limited thereto, and in S302, the server 200 (the control device 250) may not only supplement the spare vehicle by the decreased number, but may also reselect all spare vehicles.

When the selection of the spare vehicle is ended in S302, the control device 250 sends a notification indicating the start of the power adjustment to a user terminal of the selected spare vehicle. Thereafter, the process proceeds to S303. Further, even when the number of spare vehicles has not been decreased from the state of the previous processing routine (NO in S301), the process proceeds to S303.

In S303, the control device 250 controls the SOC of the battery 110 included in each spare vehicle selected in S102 of FIG. 9 and S302 of FIG. 11 such that it is within a predetermined range (hereinafter, referred to as a "stand-by SOC range"). The stand-by SOC range can be arbitrarily set. The stand-by SOC range may be approximately 50% (for example, an SOC range from 40% or higher to 60% or lower). The control device 250 may decide the stand-by SOC range according to the requested adjustment force. By the process of S303, the spare vehicle is maintained in a power adjustable state during the adjustment period in preparation for a case where the main vehicle cannot execute the power adjustment for some reason. By controlling the SOC of the battery 110 included in the spare vehicle such that it is within the stand-by SOC range, the spare vehicle easily executes the power adjustment instead of the main vehicle when the main vehicle stops the power adjustment during the power adjustment. When the process of S303 is executed, a series of processes illustrated in FIG. 11 is ended, and the process proceeds to S57 of FIG. 8.

With reference to FIG. 8 together with FIGS. 1, 2, and 5, in S57, the control device 250 determines whether the adjustment period of the generated adjustment force request has ended. When the adjustment period has not ended (NO in S57), the process returns to S51, and the above-described processes S51 to S54 are executed. In S54, the process illustrated in FIG. 9 is executed.

With reference to FIG. 9 together with FIGS. 1, 2, and 5 again, in second and subsequent processing routines, it is determined that the power adjustment of the power system PG has already been started (YES in S101), and the process proceeds to S103.

In S103, the control device 250 determines whether each adjustment vehicle satisfies a predetermined release condition. Then, subsequently in S104, the control device 250 releases the adjustment vehicles satisfying the release condition from the power adjustment of the power system PG. In this embodiment, the adjustment vehicles include the main vehicle and the spare vehicle. Both the main vehicle satisfying the release condition and the spare vehicle satisfying the release condition are released from the power adjustment. Thereafter, the adjustment vehicle released from the power adjustment is not recognized as the adjustment vehicle by the control device 250. When any one of the spare vehicles is released from the power adjustment, a spare vehicle is supplemented from among the VPP vehicles (that is, the vehicles 100 that have not reached the release positions in the power supply lane of the road R10) in the above-described S302 of FIG. 11. As such, a sufficient number of spare vehicles are secured for the power adjustment. In this embodiment, it is perceived that when the adjustment vehicle satisfies at least one of requirements A to C described below, it is recognized that the release condition is satisfied, and the adjustment vehicle is released from the power adjustment.

The requirement A is that the adjustment vehicle traveling in the power supply lane of the road R10 toward the exit has reached the release position (see FIG. 5). In this embodiment, the control device 250 decides the release position (and thus, a distance Dx of FIG. 5) for each adjustment vehicle. Specifically, the control device 250 may decide the release position for each adjustment vehicle such that the SOC of the battery 110 included in the adjustment vehicle reaches a target SOC (see FIG. 12 described below) by the charging during the traveling after the release, using the position of the adjustment vehicle in the power supply lane of the road R10, the vehicle speed of the adjustment vehicle, and the SOC of the battery 110 included in the adjustment vehicle. However, the method of deciding the release position is not limited thereto, and can be appropriately changed. For example, the control device 250 may decide the release position for each adjustment vehicle using the vehicle speed of the adjustment vehicle such that a time (hereinafter, also referred to as an "exit reach time") required for the adjustment vehicle to move from the release position of the power supply lane to the exit is equal to or longer than a predetermined time (for example, 10 minutes). As the exit reach time is longer, the adjustment vehicle more easily secures power for the traveling after leaving the power supply lane by the charging during the traveling after the release.

The requirement B is that the SOC of the battery 110 included in the adjustment vehicle becomes equal to or lower than a predetermined SOC value (hereinafter, referred to as a "release SOC"). The release SOC may be, for example, an SOC value close to an empty state. For example, when the SOC of the battery 110 included in the adjustment vehicle becomes equal to or lower than the release SOC by the discharging for the power adjustment of the power system PG, the adjustment vehicle is released from the power adjustment.

The requirement C is that the control device 250 receives a release request from the user of the adjustment vehicle. The user of the adjustment vehicle can input a release request to the adjustment vehicle (the ECU 150) via the HMI 185. The release request input from the user is sent from the adjustment vehicle to the server 200. Upon receiving the release request from the user of the adjustment vehicle, the control device 250 releases the adjustment vehicle belonging to the user from the power adjustment of the power system PG even when the adjustment vehicle does not reach the release position of the power supply lane (that is, even when the adjustment vehicle does not satisfy the requirement A.)

When none of the adjustment vehicles satisfies the release condition, the process proceeds to S105 without releasing any of the adjustment vehicles from the power adjustment. When any one of the adjustment vehicles satisfies the release condition, the process proceeds to S105 after the adjustment vehicle (the adjustment vehicle satisfying the release condition) is released from the power adjustment. In this embodiment, on the vehicle 100 (hereinafter, also referred to as a "released vehicle") released from the power adjustment by the process of S104, processing illustrated in FIG. 12 described below will be executed. A series of processes illustrated in FIG. 12 is executed in parallel with the processes illustrated in FIGS. 8 to 11.

Figure 12:
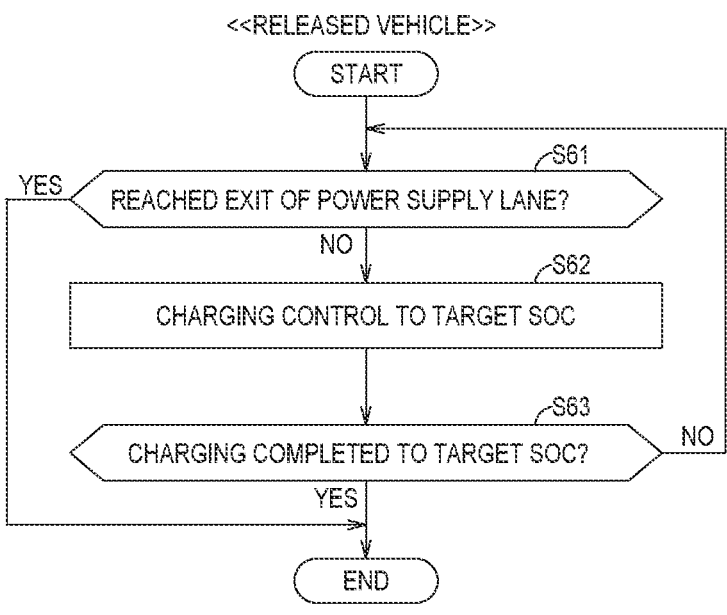
FIG. 12 is a flowchart illustrating a charging control during traveling that is executed on a vehicle released from the power adjustment of the external power source by the processing illustrated in FIG. 9.

FIG. 12 is a flowchart illustrating the charging control executed on the released vehicle. The processing illustrated in FIG. 12 is executed for each released vehicle. In this embodiment, when the vehicle 100 traveling in the power supply lane of the road R10 is released from the power adjustment by the process of S104 of FIG. 9, the ECU 150 of the released vehicle 100 (the released vehicle) executes the process illustrated in FIG. 12 according to the program stored in the storage device 153. However, the present disclosure is not limited thereto, and the ECU 150 of the released vehicle may execute the processing illustrated in FIG. 12 according to an instruction from the server 200.

With reference to FIG. 12 together with FIGS. 1, 2, and 5, in S61, the ECU 150 determines whether the released vehicle has reached the exit of the power supply lane. The ECU 150 may make the determination of S61 based on GPS signals sequentially received by the NAVI 180. Alternatively, the ECU 150 may make the determination of S61 using the information from the server 200 or the road R10 (the power supply facilities 300A, 300B, and the like).

When the released vehicle is traveling in the power supply lane of the road R10 (NO in S61), in S62, the ECU 150 executes the charging control of the battery 110 such that the SOC of the battery 110 mounted on the released vehicle becomes close to the predetermined target SOC. The target SOC may be set in advance by the user. Alternatively, the ECU 150 may decide the target SOC according to a traveling plan (for example, a destination) of the released vehicle.

In S62, the charging during the traveling is executed. Specifically, the released vehicle receives the power supply from the power supply facility 300A or 300B by the processes (the processes S210 to S260 and S310 to S350) illustrated in FIG. 3 while traveling in the power supply lane of the road R10. When the released vehicle approaches (YES in S310), each power supply facility (the power supply facility 300A or 300B) provided in the power supply lane of the road R10 executes the power transmission to the approaching released vehicle (S330), and when the released vehicle travels away (YES at S340), each power supply facility stops the power transmission (S350). When the power supply facilities that execute the power supply on the released vehicle traveling in the power supply lane are sequentially switched according to the traveling position of the released vehicle, the released vehicle traveling in the power supply lane can continuously or intermittently execute the charging during the traveling.

After the process of S62, in S63, the ECU 150 determines whether the SOC of the battery 110 of the released vehicle has become equal to or higher than the target SOC. Then, when the SOC of the battery 110 of the released vehicle has not reached the target SOC (NO in S63), the process returns to S61.

When the released vehicle has reached the exit of the power supply lane of the road R10 (YES in S61) or when the SOC of the battery 110 of the released vehicle has become equal to or higher than the target SOC (YES in S63), the series of processes illustrated in FIG. 12 is ended. As such, in this embodiment, the released vehicle (including the adjustment vehicle that has reached the release position) executes the charging control of the battery 110 such that the SOC of the battery 110 included in the released vehicle becomes close to the predetermined target SOC. The released vehicle can accumulate power for the traveling after leaving the power supply lane in the battery 110 by the power supply from the power supply facility. With such a configuration, power shortage of the adjustment vehicle after leaving the power supply lane is restricted.

With reference to FIG. 9 together with FIGS. 1, 2, and 5 again, in S105, the control device 250 determines whether any one of the main vehicles executing the power adjustment has stopped the power adjustment during the power adjustment. For example, when the main vehicle has been released from the power adjustment in S104, the control device 250 determines that the main vehicle has stopped the power adjustment during the power adjustment. Alternatively, when the server 200 has received an abnormality signal from any one of the main vehicles, the control device 250 determines that the main vehicle has stopped the power adjustment during the power adjustment. Alternatively, when the main vehicle traveling in the power supply lane of the road R10 in the previous processing routine has deviated from the power supply lane, the control device 250 also determines that the main vehicle has stopped the power adjustment during the power adjustment. The method of determining whether the main vehicle has deviated from the power supply lane may be the same as the method of determining whether the spare vehicle has deviated from the power supply lane (see S301 of FIG. 11).

Alternatively, the control device 250 monitors the SOC of the battery 110 included in each main vehicle during the adjustment period. Using the SOC of the battery 110 included in the main vehicle, the control device 250 determines whether the main vehicle has stopped the power adjustment during the power adjustment. When the SOC of the battery 110 included in the main vehicle is not within the predetermined range, the control device 250 determines that the main vehicle has stopped the power adjustment during the power adjustment even when the main vehicle is traveling in the power supply lane of the road R10. For example, in the case where the charging (increasing demand) is requested by the generated adjustment force request, when there is a main vehicle of which the SOC of the battery 110 is equal to or higher than the predetermined SOC value (for example, the SOC value indicating the fully charged state), the control device 250 determines that the main vehicle has stopped the power adjustment during the power adjustment. Alternatively, in a case where the discharging (increasing supply) is requested by the generated adjustment force request, when there is a main vehicle of which the SOC of the battery 110 is equal to or lower than a predetermined SOC value (for example, the SOC value indicating the empty state), the control device 250 determines that the main vehicle has stopped the power adjustment during the power adjustment. Alternatively, when the SOC of the battery 110 included in the main vehicle shows a movement (lowering with respect to the charging request or rising with respect to the discharging request) opposite to the requested adjustment force, the control device 250 determines that the main vehicle has stopped the power adjustment during the power adjustment.

When any one of the main vehicles has stopped the power adjustment of the power system PG using the power supply facilities 300A, 300B before an expiration of the adjustment period (YES in S105), in S106, the control device 250 causes a spare vehicle to execute the power adjustment of the power system PG instead of the main vehicle that has stopped the power adjustment. The control device 250 operates the spare vehicle according to the adjustment force (see S201 of FIG. 10) allocated to the main vehicle that has stopped the power adjustment, and may operate a plurality of spare vehicles instead of one main vehicle.

Subsequently in S107, the control device 250 selects a new main vehicle from among the VPP vehicles (that is, the vehicles 100 that have not reached the release positions in the power supply lane of the road R10) while causing the spare vehicle to execute the power adjustment of the power system PG as above. For example, using at least one of the SOC, the full charging capacity, the rated charging power, and the rated discharging power of the battery 110 included in the vehicle 100, the control device 250 determines whether each VPP vehicle corresponds to the target adjustment force (the requested adjustment force). Then, the control device 250 selects a new main vehicle from among the remaining vehicles 100 excluding the main vehicle executing the power adjustment and the vehicle 100 that does not correspond to the target adjustment force (the requested adjustment force) from among the VPP vehicles. The control device 250 selects (supplements) the main vehicles by the decreased number. The control device 250 may select the main vehicles from among the spare vehicles. The control device 250 may select, as the new main vehicle, the spare vehicle (the spare vehicle that has started the power adjustment of the power system PG in S106) executing the power adjustment. In other words, the control device 250 may supplement the main vehicle by changing the spare vehicle executing the power adjustment to the main vehicle.

When the selection (supplementation) of the main vehicle is ended in S107, the control device 250 sends a notification indicating the start of the power adjustment to a user terminal of the selected main vehicle. Thereafter, in S108, after the control device 250 ends the power adjustment (S106) by the spare vehicle described above, the process proceeds to S55 of FIG. 8. In S55 of FIG. 8 (the processing illustrated in FIG. 10), the power adjustment of the power system PG is executed by each main vehicle including the main vehicle supplemented in S107.

When all the main vehicles are continuing the power adjustment of the power system PG (NO in S105), the process proceeds to S55 of FIG. 8 without going through S106 to S108. In other words, the power adjustment of the power system PG is executed by the main vehicle in S55 of FIG. 8 (the processing illustrated in FIG. 10) without changing a main vehicle.

With reference to FIG. 8 together with FIGS. 1, 2, and 5 again, during the adjustment period (NO in S57), the power adjustment of the power system PG by the power supply lane of the road R10 is executed by the process of S55 described above (see FIG. 10). Further, the spare vehicle is maintained in the power adjustable state by the process of S56 described above (see FIG. 11). Then, when the adjustment period passes (YES in S57), after the process of S58 is executed, the series of processes illustrated in FIG. 8 is ended. As such, all the adjustment vehicles are released from the power adjustment. In S58, the control device 250 sends a notification indicating the end of the power adjustment to the user terminal of each adjustment vehicle.

In the power supply system (see FIGS. 1 to 12) having the configuration described above, it is difficult for the vehicle 100 in the power supply lane selected for the power adjustment of the external power source (the power system PG) to be in the power shortage state after leaving the power supply lane. Further, the power adjustment method according to this embodiment includes the processing illustrated in each of FIGS. 6 to 12.

In S102 of FIG. 9, the server 200 selects an adjustment vehicle used for the power adjustment of the power system PG from among the vehicles 100 traveling in the traveling lanes R1, R2 provided with the power supply facilities 300A, 300B that receive the power supply from the power system PG. In S55 of FIG. 8 (the processing illustrated in FIG. 10), the server 200 operates the adjustment vehicle (the main vehicle) for the power adjustment of the power system PG. Then, in S104 of FIG. 9, when any one of the selected adjustment vehicles has reached the release position in the power supply lane of the road R10, the server 200 releases the adjustment vehicle that has reached the release position from the power adjustment of the power system PG. By the above method, it is also difficult for the vehicle 100 in the power supply lane that has been selected for the power adjustment of the external power source (the power system PG) to be in the power shortage state after leaving the power supply lane.

In the above embodiment, when the adjustment vehicle satisfies at least one of the requirements A to C, it is perceived that the adjustment vehicle satisfies the release condition. However, the release condition is not limited thereto, and can be appropriately changed. For example, at least one of the requirements B and C may be omitted. Further, only a predetermined adjustment vehicle (at least one of the main vehicle and the spare vehicle) that has reached the release position may be released from the power adjustment of the external power source.

In the above embodiment, the main vehicle and the spare vehicle are selected as the adjustment vehicles. However, it is not essential to select a spare vehicle as the adjustment vehicle, and the power adjustment of the external power source may be executed only by the main vehicle.

In an embodiment where the vehicle group VG managed by the vehicle management apparatus 1000 includes a vehicle (a VPP contract vehicle), contracted to cooperate in the power adjustment by contract, and other vehicles (non-VPP contract vehicles), the latter non-VPP contract vehicles may be excluded from processing targets of the processing illustrated in FIGS. 6 to 9.

In the above embodiment, the vehicle 100 (FIG. 2) includes a power accumulation device configured to be chargeable with power from the traveling lane of the road R10 on which the vehicle 100 is traveling. In an embodiment where the vehicle group VG managed by the vehicle management apparatus 1000 includes a vehicle (a non-charging vehicle) that does not have a power accumulation device configured to be chargeable with power from the traveling lane of the road R10 on which the vehicle is traveling, the vehicle management apparatus 1000 may exclude such a non-charging vehicle from processing targets of the processing illustrated in FIGS. 8 and 9 when the charging for the power adjustment of the power system PG (the external power source) is requested.

In the above embodiment, the vehicle 100 (FIG. 2) includes a power accumulation device configured to be dischargeable by removing power therefrom to the power system PG through the traveling lane of the road R10 on which the vehicle 100 is traveling. In an embodiment where the vehicle group VG managed by the vehicle management apparatus 1000 includes a vehicle (a non-V2G vehicle) that does not have a power accumulation device configured to be dischargeable by removing power therefrom to the power system PG through the traveling lane of the road R10 on which the vehicle is traveling, the vehicle management apparatus 1000 may exclude such a non-V2G vehicle from the processing targets of the processing illustrated in FIGS. 8 and 9 when the discharging for the power adjustment of the power system PG is requested.

A road to which the power supply system is applied is not limited to the road R10 illustrated in FIG. 5. The road to which the power supply system is applied may be a general road or an expressway. A gate through which only a predetermined vehicle (for example, a management vehicle or a vehicle that has reserved the power supply facility provided in the power supply lane) can pass may be provided at the entrance of the power supply lane of the road R10. The length of the power supply lane (the area in which the power supply facility is installed in the road) is arbitrary, and may be, for example, 5 km or longer and 100 km or shorter, or several km. The road R10 illustrated in FIG. 5 is provided with two power supply lanes and one non-power supply lane, but may be provided with more non-power supply lanes than the power supply lanes. The above-described power supply system may be applied to a road having one power supply lane, or three or more power supply lanes, or a road having no non-power supply lane.

Figure 13:
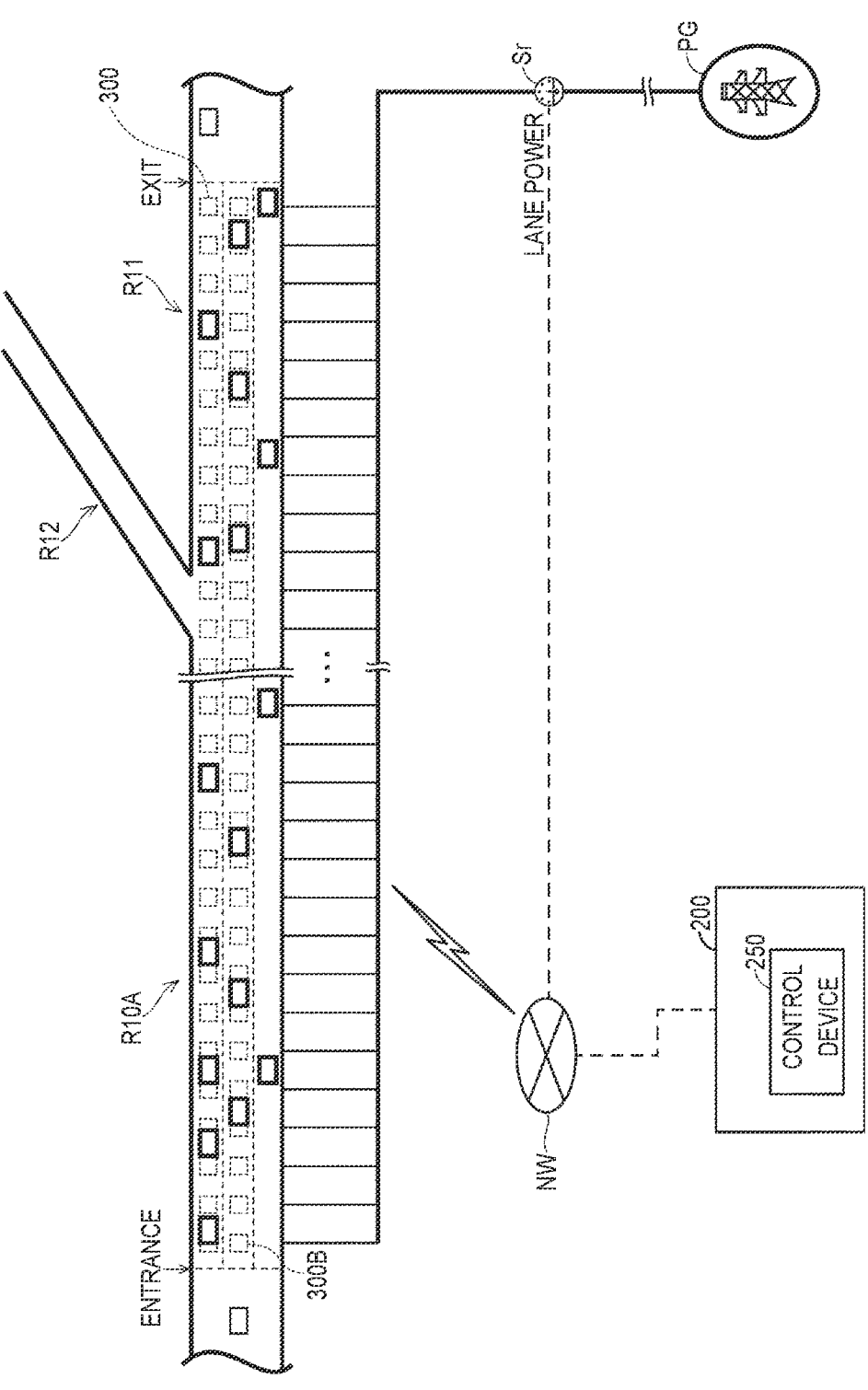
FIG. 13 is a diagram illustrating a modified example of a road illustrated in FIG. 5.

FIG. 13 is a diagram illustrating a modified example of the road illustrated in FIG. 5. With reference to FIG. 13, a road R10A including the power supply lane is branched into a First road R11 including the power supply lane and a second road R12 (a non-power supply lane) including no power supply lane. When the adjustment vehicle traveling in the power supply lane of the road R10A has preceded to the second road R12 in at least one of S105 of FIG. 9 and S301 of FIG. 11, the control device 250 may determine that the adjustment vehicle has deviated from the power supply lane.

The configuration of the system is not limited to that illustrated in FIG. 1. Another server (for example, a server of an upper level aggregator) may be provided between the server 700 and the server 200. In the above embodiment, an on-premises server is employed as each of the servers 200 and 500 (see FIG. 1). However, the present disclosure is not limited thereto, and functions of the servers 200 and 500 (particularly, functions related to vehicle management) may be implemented in a cloud by a cloud computing system. Further, at least a part of the functions of the server 500 may be implemented in the server 200.

The configuration of the management vehicle is not limited to that described in the above embodiment (see FIG. 2). The vehicle group VG may include a plurality of types of managed vehicles having different configurations. The configuration of the management vehicle may be appropriately changed to a configuration dedicated to the manned traveling or a configuration dedicated to the unmanned traveling. For example, a vehicle dedicated to the unmanned traveling does not have to include a part (for example, a steering wheel) for a person to operate the vehicle. The configuration of the management vehicle is not necessarily limited to a configuration having an autonomous driving function.

An xEV other than a BEV may be employed as the management vehicle. An xEV (for example, a hybrid electric vehicle, a fuel cell electric vehicle, and a range extender EV) configured to be chargeable and/or dischargeable during the traveling may be employed as the management vehicle. The management vehicle may be a hybrid electric vehicle including a hydrogen engine and a power accumulation device. The management vehicle may include a solar panel or a flight function. The management vehicle is not limited to a passenger car, and may be a bus or a truck. The management vehicle may be a privately owned vehicle (POV) or a Mobility as a Service (MaaS) vehicle. The MaaS vehicle is managed by a MaaS business operator. The management vehicle may be a multi-purpose vehicle customized according to a purpose of use of the user. The management vehicle may be a mobile store vehicle, a robotaxi, an automated guided vehicle (AGV), or an agricultural machine. The management vehicle may be an unmanned or one-seater small-sized BEV (for example, a micropallet or an electric skater).

A power supply system according to a first aspect of the present disclosure includes a power supply facility and a vehicle management apparatus. The power supply facility is configured to receive power supply from an external power source and execute power supply to a vehicle traveling in a traveling lane. The vehicle management apparatus is configured to manage a plurality of vehicles configured to use the power supply facility, select adjustment vehicles used for power adjustment of the external power source from among the plurality of vehicles, and when any one of the selected adjustment vehicles has reached a predetermined position in the traveling lane, release the one of the adjustment vehicles that has reached the predetermined position from the power adjustment of the external power source. Hereinafter, the traveling lane (the traveling lane in which the power supply facility as above is provided) is also referred to as a "power supply lane". The predetermined position is also referred to as a "release position".

With the above configuration, the adjustment vehicle (the vehicle selected for the power adjustment of the external power source) is released from the power adjustment of the external power source when the adjustment vehicle reaches the release position of the power supply lane. After being released from the power adjustment, the adjustment vehicle can secure power for traveling after leaving the power supply lane by receiving power supply from the power supply lane. For this reason, the vehicle that has executed the power adjustment of the external power source is restricted from being in a power shortage state (a state where power for traveling is insufficient) after leaving the power supply lane.

The adjustment vehicle may execute charging or discharging for the power adjustment of the external power source. The adjustment vehicle may further include a vehicle standing by for the power adjustment of the external power source, in addition to the vehicle executing the charging or the discharging for the power adjustment. The release position may be an end of the power supply lane (on an exit side from a midpoint of the power supply lane). The adjustment force means an overall ability for executing the power adjustment of the external power source (a frequency control, a supply and demand balance adjustment, or the like), and also includes a spare force. The external power source may be a power grid (for example, a microgrid or a large-scale power grid developed as an infrastructure). The external power source may supply alternating current power or direct current power. The vehicle management apparatus may be a stationary server or may be mounted on a mobile terminal. The vehicle management apparatus may include one or more computers. The vehicle management apparatus may be a cloud server.

In the first aspect, the vehicle management apparatus may be configured to, when the power adjustment of the external power source is requested, select, as the adjustment vehicles, a main vehicle used for securing a requested adjustment force and a spare vehicle that executes the power adjustment of the external power source instead of the main vehicle when the main vehicle stops the power adjustment of the external power source during the power adjustment. The number of the selected main vehicles may be one or more, and the number of the selected spare vehicles may one or more. With such a configuration, when the main vehicle stops the power adjustment of the external power source during the power adjustment, the spare vehicle can execute the power adjustment instead of the main vehicle.

In the first aspect, the vehicle management apparatus may be configured to, when any one of the main vehicles has reached the predetermined position in the traveling lane, release the one of the main vehicles that has reached the predetermined position from the power adjustment of the external power source, and select a new main vehicle while causing the spare vehicle to execute the power adjustment of the external power source.

When the main vehicle that has reached the release position is released from the power adjustment, it is considered that there is a shortage of the number of main vehicles for the power adjustment. In the above configuration, the spare vehicle executes the power adjustment instead of the main vehicle released from the power adjustment. Then, a new main vehicle is selected while the spare vehicle executes the power adjustment. With such a configuration, it is easy to continuously execute the power adjustment of the external power source.

In the first aspect, the vehicle management apparatus may be configured to supplement the main vehicle by selecting the spare vehicle as the new main vehicle and changing the spare vehicle to the main vehicle. With such a configuration, it is easy to continuously execute the power adjustment of the external power source.

In the first aspect, the vehicle management apparatus may be configured to, when any one of the spare vehicles has reached the predetermined position for the traveling lane, release the one of the spare vehicles that has reached the predetermined position from the power adjustment of the external power source, and supplement the space vehicle from among the plurality of vehicles that have not reached the predetermined position in the traveling lane.

The spare vehicle selected for the power adjustment of the external power source is provided when the main vehicle is not able to execute the power adjustment for some reason (for example, a deviation from the power supply lane, insufficient storage capacity, or failure), and maintained in a state where the power adjustment is possible. With the above configuration, it is possible for the spare vehicle that has reached the release position to be released from the power adjustment, and to secure power for traveling after leaving the power supply lane. As such, it is difficult for the spare vehicle to be in a power shortage state after leaving the power supply lane.

In the first aspect, each of the plurality of vehicles may include a power accumulation device. The vehicle management apparatus may be configured to control a state-of-charge (SOC) of the power accumulation device included in the spare vehicle such that the SOC is within a predetermined range. In this manner, by controlling the SOC of the power accumulation device included in the spare vehicle such that the SOC is within the predetermined range, the spare vehicle easily executes the power adjustment instead of the main vehicle when the main vehicle stops the power adjustment of the external power source during the power adjustment.

In the first aspect, each of vehicles selected as the adjustment vehicles when charging for the power adjustment of the external power source is requested may include a power accumulation device configured to be chargeable with power from the power supply facility during traveling in the traveling lane. The vehicle management apparatus may be configured to, when the charging for the power adjustment of the external power source is requested, decide charging power for each of the main vehicles traveling in the power supply lane, and send a first command for causing the main vehicle traveling in the traveling lane to execute the charging by the decided charging power. The main vehicle may be configured to charge the power accumulation device with power from the power supply facility according to the first command.

With the above configuration, the vehicle management apparatus can easily and accurately operate the power accumulation device as an adjustment force by controlling the adjustment vehicle by, for example, a remote control (in more detail, a charging control of the power accumulation device included in the main vehicle).

In the first aspect, each of vehicles selected as the adjustment vehicles when discharging for the power adjustment of the external power source is requested may include a power accumulation device configured to be dischargeable to the external power source through the power supply facility during the traveling in the traveling lane. The vehicle management apparatus may be configured to, when the discharging for the power adjustment of the external power source is requested, decide discharging power for each of the main vehicles, and send a second command for causing the main vehicle traveling in the traveling lane to execute the discharging by the decided discharging power or stop charging. The main vehicle may be configured to execute the discharging from the power accumulation device to the external power source or stop charging the power accumulation device according to the second command.

With the above configuration, the vehicle management apparatus can easily and accurately operate the power accumulation device as an adjustment force by controlling the adjustment vehicle by, for example, a remote control (in more detail, a discharging control or a charging stop control of the power accumulation device included in the main vehicle).

In the first aspect, the vehicle management apparatus may be configured to decide the predetermined position for each of the adjustment vehicles; and decide the predetermined positions for the adjustment vehicles using respective vehicle speeds of the adjustment vehicles. With such a configuration, it is easy to decide an appropriate release position for each adjustment vehicle.

In the first aspect, each of the plurality of vehicles may include a power accumulation device. A first vehicle that is the one of the adjustment vehicles that has reached the predetermined position, may be configured to execute, after being released from the power adjustment of the external power source, the charging control of the power accumulation device such that a SOC of the power accumulation device of the first vehicle is close to a predetermined target SOC. With such a configuration, the adjustment vehicle is restricted from being short of power after leaving the power supply lane. Further, in such a form, the vehicle management apparatus may decide the release position of the adjustment vehicle using the SOC of the power accumulation device included in the adjustment vehicle and the target SOC set in advance in the adjustment vehicle in addition to the vehicle speed of the adjustment vehicle and the position of the adjustment vehicle in the power supply lane.

In the first aspect, the vehicle management apparatus may be configured to, upon receiving a release request from a user of any one of the adjustment vehicles, release the one of the adjustment vehicles belonging to the user from the power adjustment of the external power source even when the adjustment vehicle has not reached the predetermined position in the traveling lane. With such a configuration, it is possible to release the adjustment vehicle from the power adjustment for convenience of the user. As such, the user's convenience is improved.

In the first aspect, the vehicle management apparatus may be configured to estimate the number of vehicles, among the plurality of vehicles, that have not reached the predetermined position in the traveling lane during a predetermined period, and bid for the adjustment force during the predetermined period in the power market using the estimated number of vehicles. With such a configuration, it is easy for the vehicle management apparatus to win the bid (a contract) in the power market for the offerable adjustment force, which is estimated from the number of vehicles on a day on which the power adjustment is requested. Then, the adjustment force, for which the bid has been won by the vehicle management apparatus, is easily offered from the power supply lane to the external power source according to the contract.

A server according to a second aspect of the present disclosure includes a processor configured to manage a plurality of vehicles configured to use a power supply facility that receives power supply from an external power source and executes power supply to a vehicle traveling in a traveling lane, select adjustment vehicles used for power adjustment of the external power source from among the plurality of vehicles, and when any one of the selected adjustment vehicles has reached a predetermined position in the traveling lane, release the one of the adjustment vehicles that has reached the predetermined position from the power adjustment of the external power source.

In the same manner as in the above-described power supply system, in the server, it is also difficult for a vehicle in the power supply lane selected for the power adjustment of the external power source to be in a power shortage state after leaving the power supply lane.

A power adjustment method according to a third aspect of the present disclosure includes selecting adjustment vehicles used for power adjustment of an external power source from among vehicles traveling in a traveling lane provided with a power supply facility that receives power supply from the external power source, operating the adjustment vehicle used for the power adjustment of the external power source, and when any one of the selected adjustment vehicles has reached a predetermined position in the traveling lane, releasing the one of the adjustment vehicles that has reached the predetermined position from the power adjustment of the external power source.

In the same manner as in the above-described power supply system, in the server, it is also difficult for a vehicle in the power supply lane selected for the power adjustment of the external power source to be in a power shortage state after leaving the power supply lane.

The embodiment disclosed herein needs to be considered as illustrative in all points and not restrictive. The technical scope disclosed in the present disclosure is shown not by the above description of the embodiments but by the claims, and is intended to include meanings equivalent to the claims and all modifications within the scope thereof.

What is claimed is:

1. A power supply system comprising:
a power supply facility configured to
    receive power supply from an external power source and
    execute power supply to a vehicle traveling in a traveling lane; and
a vehicle management apparatus configured to
    manage a plurality of vehicles configured to use the power supply facility,
    select adjustment vehicles used for power adjustment of the external power source from among the plurality of vehicles, and
    when any one of the selected adjustment vehicles has reached a predetermined position in the traveling lane, release the one of the adjustment vehicles that has reached the predetermined position from the power adjustment of the external power source.

2. The power supply system according to claim 1, wherein the vehicle management apparatus is configured to, when the power adjustment of the external power source is requested, select, as the adjustment vehicles, a main vehicle used for securing a requested adjustment force and a spare vehicle that executes the power adjustment of the external power source instead of the main vehicle when the main vehicle stops the power adjustment of the external power source during the power adjustment, the number of the selected main vehicles being one or more, and the number of the selected spare vehicles being one or more.

3. The power supply system according to claim 2, wherein the vehicle management apparatus is configured to, when any one of the main vehicles has reached the predetermined position in the traveling lane:
    release the one of the main vehicles that has reached the predetermined position from the power adjustment of the external power source; and
    select a new main vehicle while causing the spare vehicle to execute the power adjustment of the external power source.

4. The power supply system according to claim 3, wherein the vehicle management apparatus is configured to supplement the main vehicle by selecting the spare vehicle as the new main vehicle and changing the spare vehicle to the main vehicle.

5. The power supply system according to claim 2, wherein the vehicle management apparatus is configured to, when any one of the spare vehicles has reached the predetermined position in the traveling lane:
    release the one of the spare vehicles that has reached the predetermined position from the power adjustment of the external power source; and
    supplement the spare vehicle from among the plurality of vehicles that have not reached the predetermined position in the traveling lane.

6. The power supply system according to claim 2, wherein:
    each of the plurality of vehicles includes a power accumulation device; and
    the vehicle management apparatus is configured to control a state of charge (SOC) of the power accumulation device included in the spare vehicle such that the SOC is within a predetermined range.

7. The power supply system according to claim 2, wherein:
    each of vehicles selected as the adjustment vehicles when charging for the power adjustment of the external power source is requested includes a power accumulation device configured to be chargeable with power from the power supply facility during traveling in the traveling lane;
    the vehicle management apparatus is configured to, when the charging for the power adjustment of the external power source is requested:
        decide charging power for each of the main vehicles; and
        send a first command for causing the main vehicle traveling in the traveling lane to execute the charging by the decided charging power; and
    the main vehicle is configured to charge the power accumulation device with power from the power supply facility according to the first command.

8. The power supply system according to claim 2, wherein:

each of vehicles selected as the adjustment vehicles when discharging for the power adjustment of the external power source is requested includes a power accumulation device configured to be dischargeable to the external power source through the power supply facility during the traveling in the traveling lane; and the vehicle management apparatus is configured to, when the discharging for the power adjustment of the external power source is requested decide discharging power for each of the main vehicles, and send a second command for causing the main vehicle traveling in the traveling lane to execute the discharging by the decided discharging power or stop charging; and the main vehicle is configured to execute the discharging from the power accumulation device to the external power source or stop charging the power accumulation device according to the second command.

9. The power supply system according to claim 1, wherein the vehicle management apparatus is configured to:

decide the predetermined position for each of the adjustment vehicles; and decide the predetermined positions for the adjustment vehicles using respective vehicle speeds of the adjustment vehicles.

10. The power supply system according to claim 1, wherein:

each of the plurality of vehicles includes a power accumulation device; and a first vehicle that is the one of the adjustment vehicles that has reached the predetermined position, is configured to execute, after being released from the power adjustment of the external power source, charging control of the power accumulation device such that a SOC of the power accumulation device of the first vehicle is close to a predetermined target SOC.

11. The power supply system according to claim 1, wherein the vehicle management apparatus is configured to, upon receiving a release request from a user of any one of the adjustment vehicles, release the one of the adjustment vehicles belonging to the user from the power adjustment of the external power source even when the adjustment vehicle has not reached the predetermined position in the traveling lane.

12. The power supply system according to claim 1, wherein the vehicle management apparatus is configured to:

estimate the number of vehicles, among the plurality of vehicles, that have not reached the predetermined position in the traveling lane during a predetermined period; and bid for an adjustment force for the predetermined period in a power market using the estimated number of vehicles.

13. A server comprising: a processor configured to:

manage a plurality of vehicles configured to use a power supply facility that receives power supply from an external power source and executes power supply to a vehicle traveling in a traveling lane;

select adjustment vehicles used for power adjustment of the external power source from among the plurality of vehicles; and when any one of the selected adjustment vehicles has reached a predetermined position in the traveling lane, release the one of the adjustment vehicles that has reached the predetermined position from the power adjustment of the external power source.

14. A power adjustment method comprising:

selecting adjustment vehicles used for power adjustment of an external power source from among vehicles traveling in a traveling lane provided with a power supply facility that receives power supply from the external power source;

operating the adjustment vehicles used for the power adjustment of the external power source; and when any one of the selected adjustment vehicles has reached a predetermined position in the traveling lane, releasing the one of the adjustment vehicles that has reached the predetermined position from the power adjustment of the external power source.

\* \* \* \* \*